(12) United States Patent
Seo

(10) Patent No.: US 9,060,471 B2
(45) Date of Patent: Jun. 23, 2015

(54) BINDER FOR HORTICULTURAL USE

(76) Inventor: Hae-young Seo, Daejeon-si (KR)

( * ) Notice: Subject to any disclaimer, the term of this patent is extended or adjusted under 35 U.S.C. 154(b) by 60 days.

(21) Appl. No.: 13/813,395

(22) PCT Filed: Jun. 22, 2011

(86) PCT No.: PCT/KR2011/004542
§ 371 (c)(1),
(2), (4) Date: Jan. 30, 2013

(87) PCT Pub. No.: WO2012/043968
PCT Pub. Date: Apr. 5, 2012

(65) Prior Publication Data
US 2013/0125461 A1     May 23, 2013

(30) Foreign Application Priority Data
Sep. 28, 2010   (KR) .................. 10-2010-0093627

(51) Int. Cl.
*A01G 17/08*     (2006.01)

(52) U.S. Cl.
CPC ................................ *A01G 17/085* (2013.01)

(58) Field of Classification Search
CPC .................................................. B65B 13/327
USPC ........................... 47/1.01 R, 1.01 S; 156/359
See application file for complete search history.

(56) References Cited

U.S. PATENT DOCUMENTS

| | | | |
|---|---|---|---|
| 3,368,323 A * | 2/1968 | Wood ................................ 100/2 |
| 3,438,833 A * | 4/1969 | Nakano ........................ 156/502 |
| 3,755,045 A * | 8/1973 | Takami ......................... 156/366 |
| 3,944,460 A * | 3/1976 | Karr ............................... 156/494 |
| 4,063,985 A * | 12/1977 | Kyts ............................... 156/359 |
| 4,820,363 A * | 4/1989 | Fischer .......................... 156/494 |
| 4,945,674 A * | 8/1990 | Alexandrian et al. ...... 47/1.01 R |
| 5,858,164 A * | 1/1999 | Panjwani et al. ............. 156/359 |
| 5,863,378 A * | 1/1999 | Panjwani et al. ............. 156/359 |
| 6,382,289 B1 * | 5/2002 | Jho ................................ 156/468 |
| 6,968,988 B2 * | 11/2005 | Hayashi et al. .................. 227/76 |
| 2008/0104886 A1 * | 5/2008 | Nakamura et al. ............ 47/1.1 S |

FOREIGN PATENT DOCUMENTS

| JP | 2006-050913 A | 2/2006 |
|---|---|---|
| JP | 2008-072928 A | 4/2008 |
| KR | 10-2001-0001436 A | 1/2001 |
| KR | 10-2007-0046754 A | 5/2007 |

OTHER PUBLICATIONS

International Search Report of PCT/KR2011/004542.

* cited by examiner

*Primary Examiner* — Kristen C Hayes
(74) *Attorney, Agent, or Firm* — Maxon IP, LLC; Justin H. Kim

(57) ABSTRACT

Disclosed therein is a binder for horticultural use, which is to be used to tie stems and branches to pros or guiding strings such that garden or agricultural products can be properly grown up. The binder for horticultural use that, instead of a stapler for supplying staples, includes: a taper frame having a holder groove disposed at one side thereof; a binding heating cable unit having a binding heating cable therein for receiving an electric current from a power supply unit; and a holder to which the binding heating cable unit is detachably attached, the holder being inserted into the holder groove, so that the binder can bind both ends of a tape together by partially melting the tape made of synthetic resin material by heat without using the staples.

15 Claims, 24 Drawing Sheets

(a)

(b)

(c)

BINDER FOR HORTICULTURAL USE

TECHNICAL FIELD

The present invention relates to a binder for horticultural use, which is to be used to tie stems and branches to a prop or a guiding string such that garden or agricultural products can be properly grown up, and more particularly, to a binder for horticultural use that, instead of a stapler for supplying staples, includes: a taper frame having a holder groove disposed at one side thereof; a binding heating cable unit having a binding heating cable for receiving electric current of a predetermined amount from a power supply unit; and a holder to which the binding heating cable unit is detachably attached, the holder being inserted into the holder groove, so that the binder for horticultural use can bind both ends of a tape together by partially melting the tape made of synthetic resin material by heat without using the staples. More particularly, the present invention relates to a binder for horticultural use, in which a hook lever is smoothly operated in a head step by step to catch and draw out the tape and a push lever protrudes outwardly and presses the tape to a cutter blade so as to cut the tape, thereby reducing a damage of the tape and securely catching and drawing out the tape through the smooth operation of the hook lever, and providing a smooth cutting of the tape and enhancing durability by preventing a damage and transformation of the push lever while working because the push lever protrudes outwardly from the head and presses the tape to the cutter blade only when the tape is cut.

BACKGROUND ART

In general, in the case of garden products or climbing crops, such as cucumbers, grapes, melons, tomatoes, and so on, stems or branches are broken or drop down onto the ground due to weight of the branches and fruits or due to a rainstorm while gradually growing up from young seedlings, and hence, in order to prevent the above problems, props are set up at predetermined intervals, guiding strings are mounted thereto, and then, the stems or branches are tied and fixed to the props and guiding strings.

In other words, if the garden products or climbing crops which grow with stems and branches stretching out long and narrowly are left as they are, because the stems and branches are broken and drop down onto the ground due to weight of the branches and fruits or due to a rainstorm, the stems and branches are tied to props and guiding strings to fix them to grow straight.

For this, conventionally, props and branches of crops are bound to props or guiding strings by tapes using a horticultural binder to fix them to grow properly, and as an example, Korean Patent Nos. 10-0347635 and 10-0779500 disclose binders for horticultural use.

As shown in FIG. 1, the conventional horticultural binder which is one of the prior arts includes: a handle frame 10' having pins 11' protrudingly formed at both sides of the middle part and a stopper 12' disposed at a front end portion; a tape guide 20' attached to a lower face of the handle frame 10' and having a tape case 21'; a stapler 30 rotatably mounted inside the handle frame 10' and having staples therein; an arm 40' rotatably mounted to the handle frame 10' and having a clincher 41' opposed to the stapler 30; a head 50' mounted inside the arm 40' to catch and draw out a tape; and a link 60' rotatably mounted to the arm 40' and having a handle 61' mounted at one side thereof and a hook 62' mounted at the other side.

In the case of the conventional horticultural binder, when a user presses the handle 61' and tightens the arm 40' once in a state where he or she grasps the tape guide 20' and the handle 61', a front end of the tape drawn out from the tape case 21' through the tape guide 20' is caught to a hook lever and a pressurizing lever of the head 50' mounted in the arm 40'. In the above state, when the user opens the tape guide 20' and the arm 40', the tape is drawn out in a state where it is caught to the hook lever and the pressurizing lever. After that, when the user winds the tape on the branches of the crops and the props or the guiding strings and pressurizes the tape guide 20' and the handle 61' with a stronger power to tighten the arm 40', both ends of the tape wound on the branches of the crops and the props or the guiding strings are bound by staples of the stapler 30, and at the same time, cut by a cutter blade mounted on the handle frame 10'. However, the conventional horticultural binder has various problems due to the staples used in the stapler method because the stapler 30 is used to bind both ends of the tape, and hence, there is a demand to continuously study and develop the horticultural binder.

DISCLOSURE

Technical Problem

Accordingly, the present invention has been made in an effort to solve the above-mentioned problems occurring in the conventional binder for horticultural use which binds stems and branches to props and guiding strings in order to let garden products or crops grow properly. The conventional binder for horticultural use according to the prior art having the stapler using staples has several problems in that the staples must be continuously supplied for a continuous use of the binder, in that the staples supplied from the stapler are exactly coincided with the staple grooves of the clincher of the arm to properly bind both ends of the tape by the staples, in that the user has to stop work in the case that the staples are fit into the stapler in a bent state or are exhausted, in that the binder cannot catch and cut the tape smoothly, and in that the tape is not securely caught because the front end of the tape is damaged or torn.

Technical Solution

To achieve the above objects, the present invention provides a binder for horticultural use, which includes a handle frame, a tape guide, a taper, an arm, a head, and a link, further including: a taper frame to which a cover is attached and which has a holder groove disposed at one side thereof; a binding heating cable unit having a binding heating cable which is disposed so as to receive an electric current from a power supply unit; and a holder to which the binding heating cable unit is detachably attached, the holder being inserted into the holder groove. The binding heating cable is opposed to a clincher for binding both ends of a tape, which is interposed between the binding heating cable and the clincher, by heat. The head of the binder includes: a case having an upper case and a lower case; a hook lever mounted inside the case and fit to a tension spring in such a way as to be operated rotatably; a cam plate mounted inside the case and having a cam hole; a first guide mounted inside the case and having a retainer to which a cam hole and a spring are fit; a second guide mounted inside the case and having a retainer to which a cam hole and a spring are fit; a support mounted inside the case; a rotational lever mounted inside the case and rotated by operation of the first guide and the second guide; and a push lever mounted inside the case and going into and out of the case by operation of the rotational lever.

Advantageous Effects

The binder for horticultural use according to the present invention can bind both ends of the tape together by heat by partially melting the tape made of synthetic resin material without using staples because using the taper instead of the stapler. Therefore, the binder for horticultural use according to the present invention can prevent the problems of the conventional binder that the staples must be continuously supplied for a continuous use of the binder, that the staples supplied from the stapler are exactly coincided with the staple grooves of the clincher of the arm to properly bind both ends of the tape by the staples, that the user has to stop work in the case that the staples are fit into the stapler in a bent state or are exhausted. Moreover, the binder for horticultural use according to the present invention can firmly bind both ends of the tape together by heat. Furthermore, in the head of the binder for horticultural use, the hook lever is smoothly operated step by step to catch and draw out the tape, and the push lever protrudes outwardly and presses the tape to the cutter blade so as to cut the tape, so that the binder for horticultural use can reduce a damage of the tape and securely catch and draw out the tape through the smooth operation of the hook lever, and can provide a smooth cutting of the tape and enhance durability by preventing a damage and transformation of the push lever while working because the push lever protrudes outwardly from the head and presses the tape to the cutter blade only when the tape is cut.

EXPLANATION OF ESSENTIAL REFERENCE NUMERALS IN DRAWINGS

Figure 1:
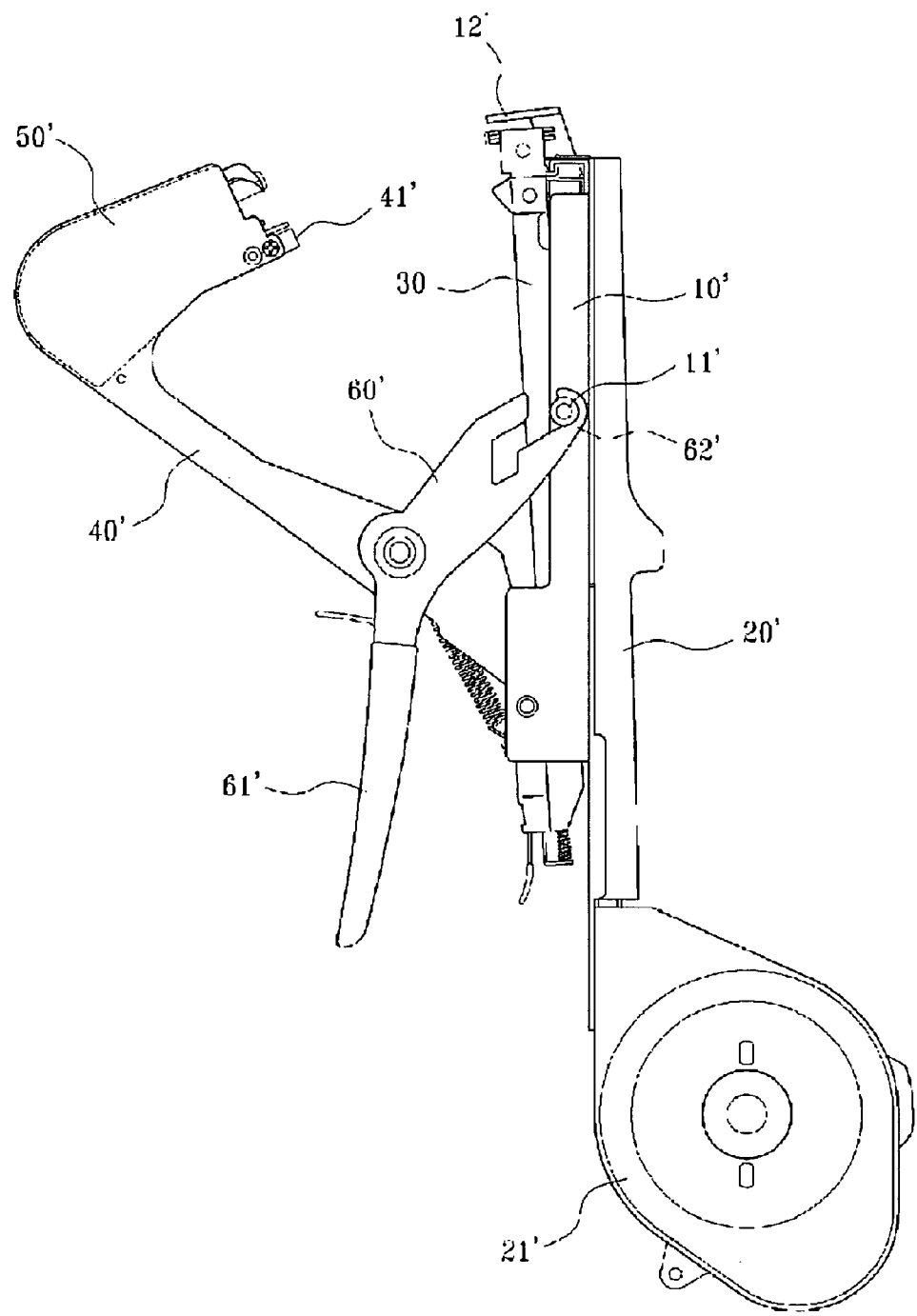
FIG. 1 is a side view of a binder for horticultural use according to a prior art.
Figure 2:
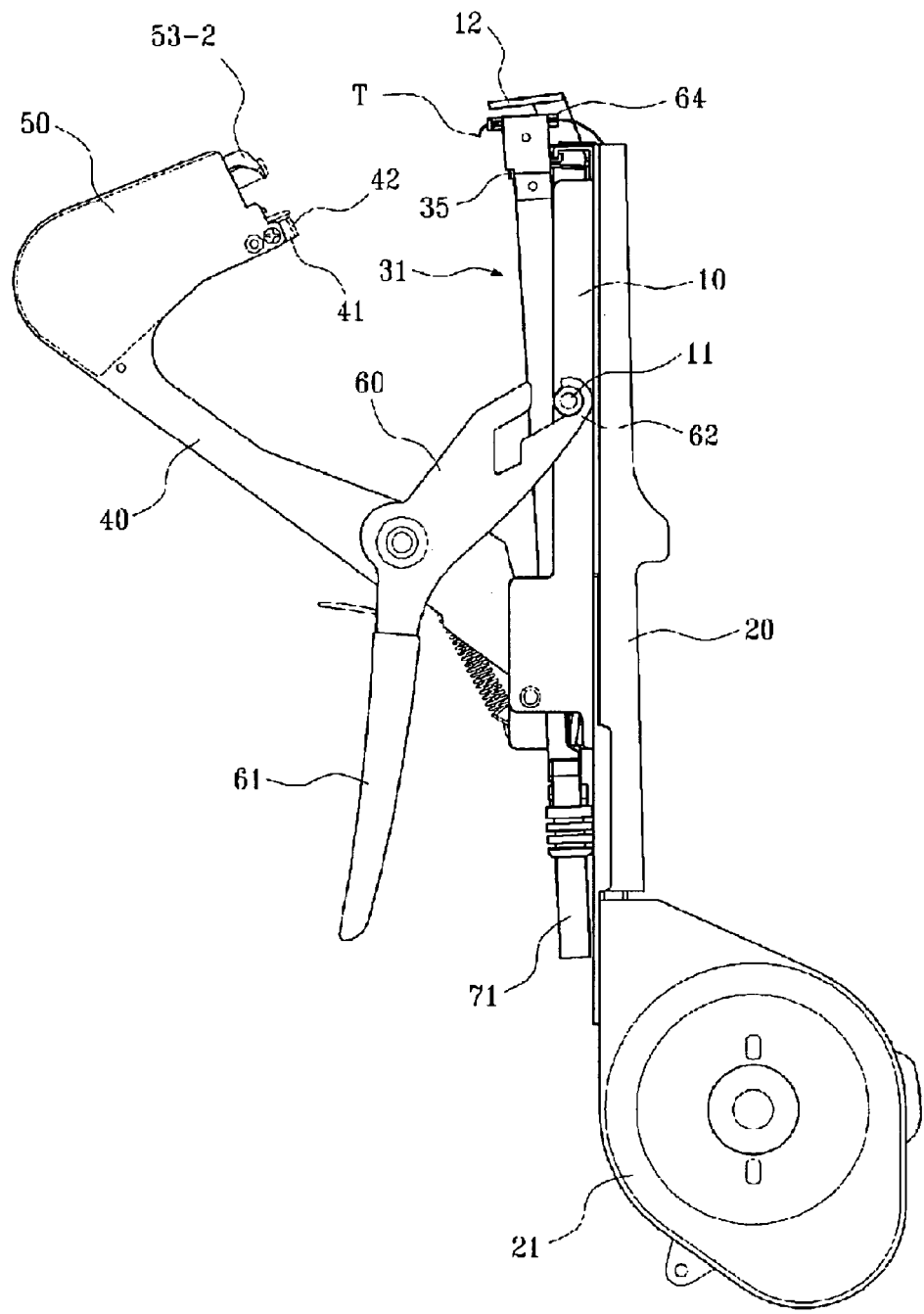
FIGS. 2 to 5 are side view of a binder for horticultural use according to a preferred embodiment of the present invention.

10: handle frame 11: pin
12: stopper 13: auxiliary blade
20: tape guide 21: tape case
31: taper 32: taper frame
33: holder groove 34: binding heating cable
34': binding heating cable
35: binding heating cable unit
35': cutting heating cable unit
36: holder 37: operation sensor
38: elastic member 40: arm
41: clincher 42: nonflammable elastic body
50: head 51: upper case 52: lower case
53: hook lever 54: cam plate
55: first guide 56: second guide
57: support 58: rotational lever
59: push lever 60: link
61: handle 62: hook
63: head corresponding unit 64: tape leading portion
70: power supply unit 71: electric wire
C: cutter blade T: tape

BEST MODE

The present invention relates to a binder for horticultural use, which is to be used to bind stems and branches to props or guiding strings such that a garden or agricultural product can be properly grown. The binder for horticultural use, which is to be used to bind stems and branches to props or guiding strings such that a garden or agricultural product can be properly grown, includes a handle frame 10, a tape guide 20, a taper 31, an arm 40, a head 50, and a link 60. The taper 31 includes: a taper frame 32 to which a cover is attached and which has a holder groove 33 disposed at one side thereof; a binding heating cable unit 35 having a binding heating cable 34 which is disposed so as to receive an electric current from a power supply unit 70; and a holder 36 to which the binding heating cable unit 35 is detachably attached, the holder 36 being inserted into the holder groove 33. The binding heating cable 34 is opposed to a clincher 41 for binding both ends of a tape T, which is interposed between the binding heating cable 34 and the clincher 41, by heat.

Mode for Invention

Hereinafter, referring to FIGS. 1 to 31, the preferred embodiment of the present invention will be described in detail as follows.

Concretely, the handle frame 10 of the binder for horticultural use according to the present invention includes pins 11 protrudingly formed on both sides in the middle of the handle frame 10 and a stopper 12 outwardly protruding from a front end portion thereof. Moreover, the tape guide 20 has a tape case 21 disposed at one side thereof, is attached to a lower face of the handle frame 10, and is disposed in such a fashion that the tape T is released from a tape reel accommodated in the tape case 21 and drawn out through the inside of the tape guide 20.

Furthermore, the arm 40 has the clincher 41 mounted at an upper end portion opposed to the taper 31 and a lower end portion of the arm 40 is rotatably mounted on a lower portion of the handle frame 10. Additionally, the head 50 is mounted inside an upper part of the arm 40, and a front end portion of the head 50 is caught and drawn out by a hook lever which is rotatably operated. In addition, the link 60 is rotatably mounted on the arm 40, and includes: a handle 61 disposed at one side so that a user can grasp it with the hand; and a hook 62 disposed at the other side joined to the pin 11 of the handle frame 10.

Figure 3:
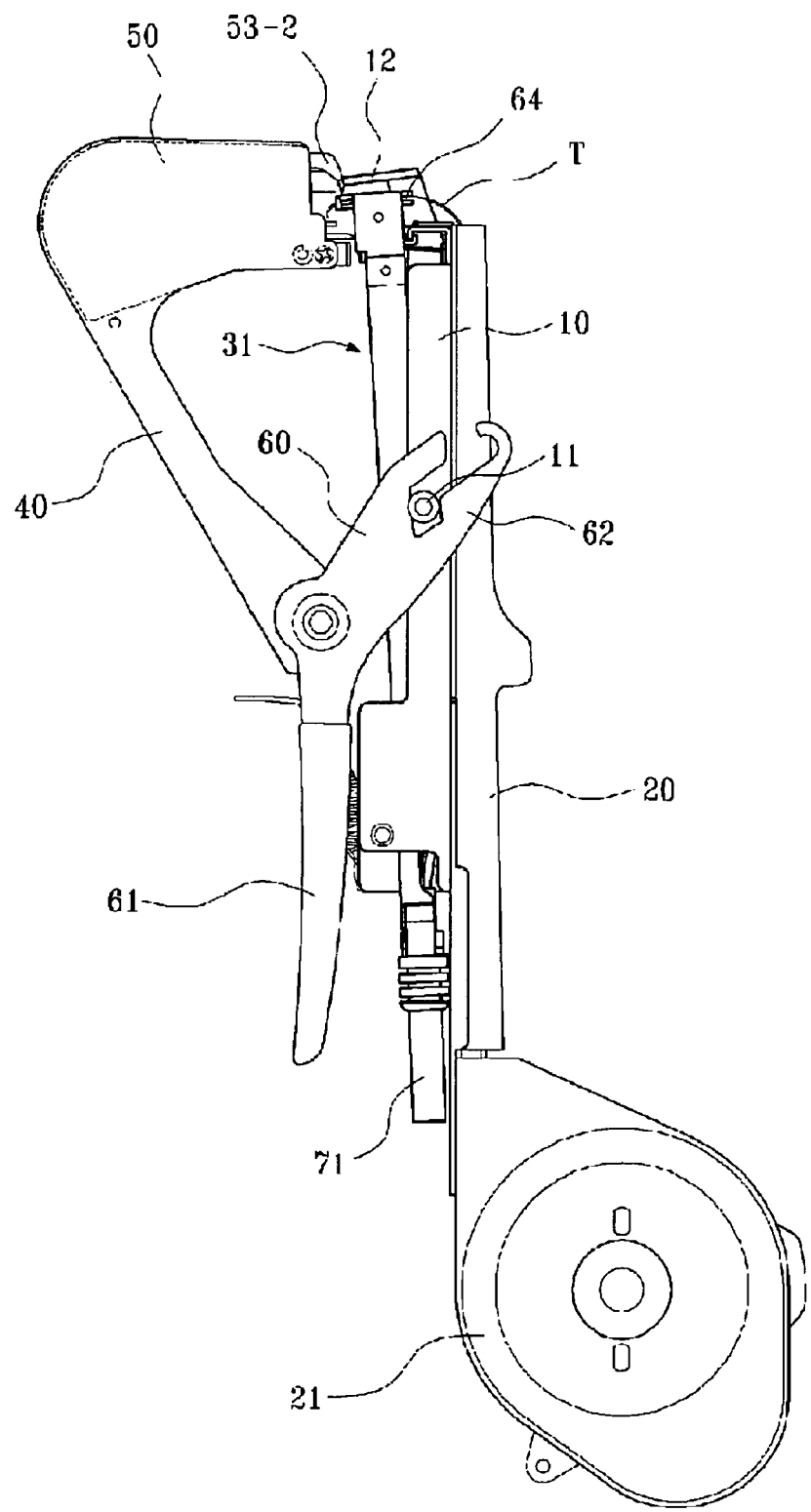
Figure 4:
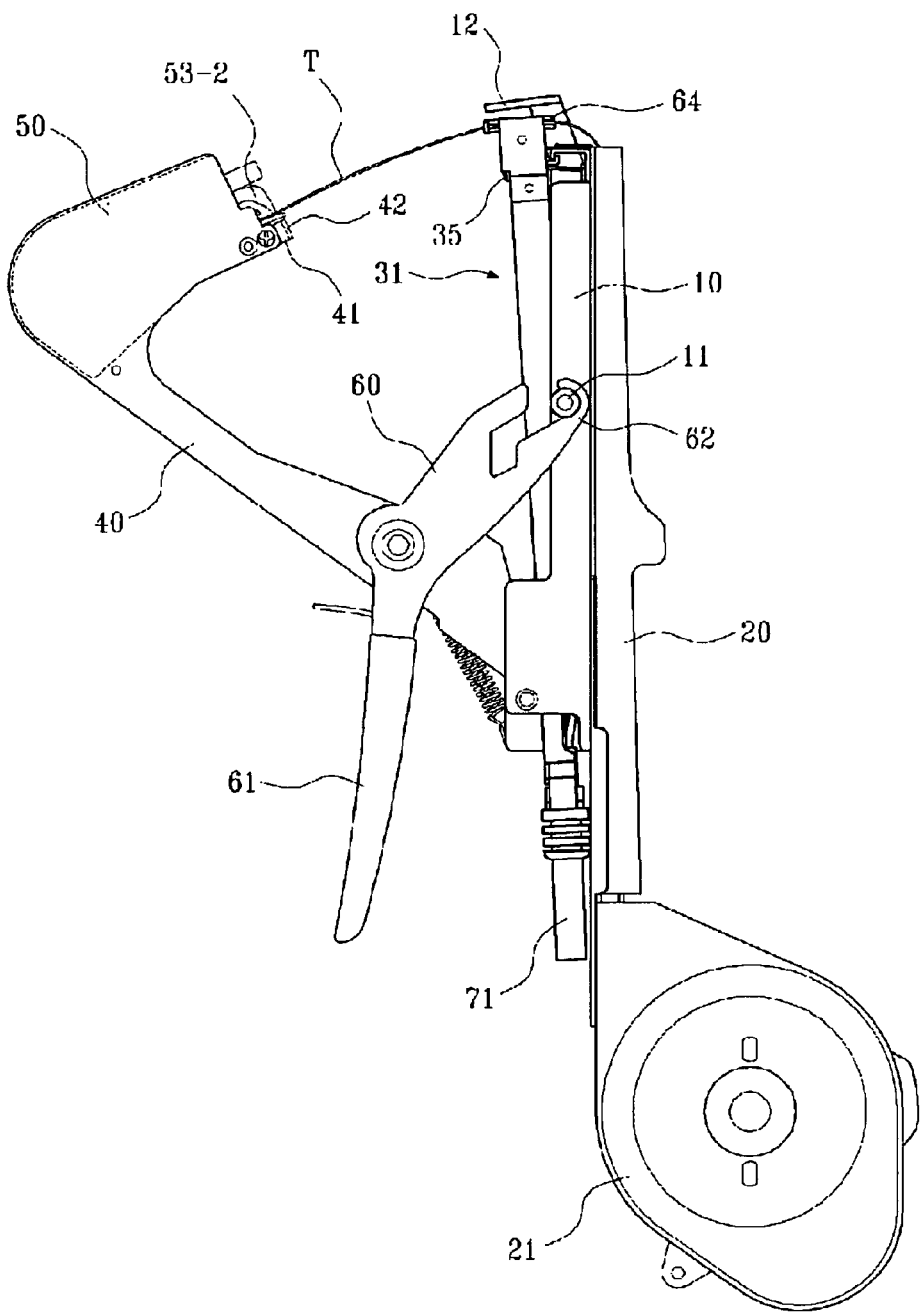
Figure 5:
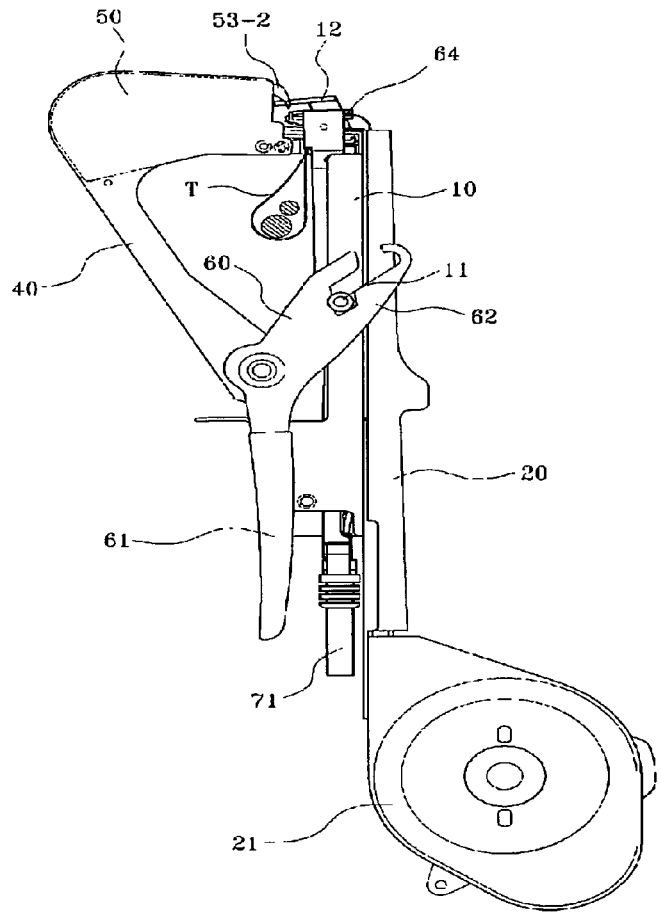
Figure 6:
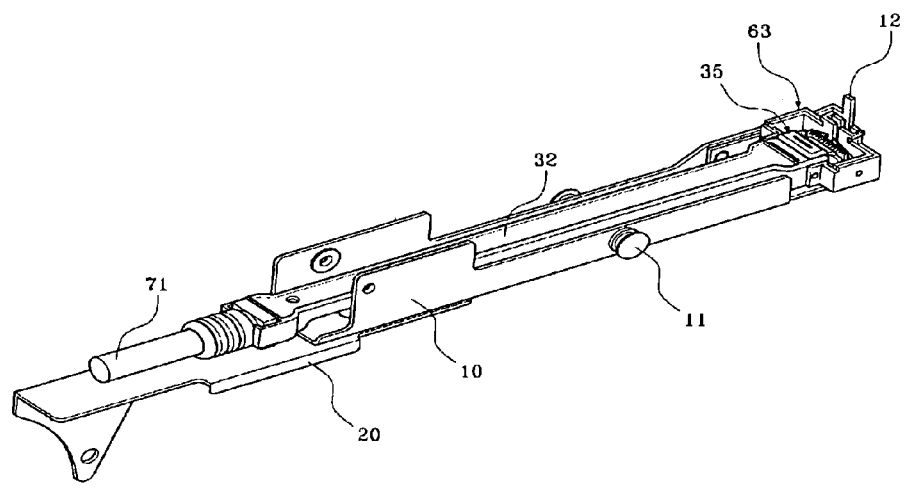
FIG. 6 is a partially perspective view showing a joined state of a taper and a handle frame of the binder for horticultural use according to the present invention.

As shown in FIG. 3, when the user grasps the tape guide 20 and the handle 61 with the hand and pressurizes the handle 61 once to tighten the arm 40 slightly, the front end of the tape T drawn out from the tape case 21 through the tape guide 20 is caught to the hook lever and a support of the head 50 mounted on the arm 40, and in the above state, when the user opens the arm 40 while releasing the pressurizing force of the handle 61, the tape T is drawn out in the state where it is caught to the hook lever and the support of the head 50. Next, as shown in FIG. 5, when the user winds the tape T onto branches of crops and props or guiding strings and pressurizes the handle 61 with a stronger power to tighten the arm 40, both ends of the tape T wound on the branches of the crops and the props or the guiding strings are bound together by heat generated from the taper 31 while the clincher 41 is pressurized to the taper 31, and at the same time, a cutter blade C mounted on the handle frame 10 cuts the tape T. Accordingly, the binder for horticultural use according to the present invention binds the branches of the crops to the props or the guiding strings with the tape T so that the crops grow properly, because the tape T is wound onto the branches of the crops and the props or the guiding strings, both ends of the tape T are bound together by heat generated from the taper 31 and the tape T is cut by the cutter blade C.

The taper 31 which is one of essential parts of the present invention includes: a taper frame 32 rotatably mounted inside the handle frame 10 and having a holder groove 33 disposed at one side; a binding heating cable unit 35 having a binding heating cable 34 which is disposed so as to receive an electric current from a power supply unit 70; and a holder 36 to which the binding heating cable unit 35 is detachably attached, the holder 36 being inserted into the holder groove 33. The binding heating cable 34 is opposed to the clincher 41 for binding both ends of a tape T, which is interposed between the binding heating cable 34 and the clincher 41, by heat.

In detail, the binder for horticultural use according to the prior art binds both ends of the tape T winding the branches of the crops and the props or the guiding strings by bending the staples of the stapler 30 with the clincher 41, however, the binder for horticultural use according to the present invention has the taper 31 instead of the stapler 30 providing the staples so as to partially melt the tape T made of synthetic resin material by heat to thereby bind both ends of the tape T together without using the staples. In other words, the holder groove 33 formed in one side (in direction that the head 50 is disposed) of the taper frame 32 is formed at the position, to which the staples of the stapler 30 of the conventional binder for horticultural use are provided, so as to supply an electric current to the heating unit which supplies not the staples but heat, and the holder 36 is inserted into the holder groove 33 in such a way as to detachably mount the heating unit.

In this instance, it is natural that a head corresponding unit 63 which has an auxiliary blade 13 and a tape leading portion 64 is joined to an outer face of the holder groove 33 of the taper frame 32 so that a hook 53-2 of the hook lever of the head 50 surely catches the tape T supplied from the tape leading portion 64 and the cutter blade T which is the auxiliary blade 13 easily cuts the tape T.

Moreover, when an electric current of a predetermined amount is supplied, because the binding heating cable unit 35 having the binding heating cable 34 which receives the electric current of a predetermined amount from the power supply unit 70 has a predetermined resistance, the binding heating cable unit 35 partially melts the tape T made of synthetic resin material using the heating cable which generates heat, and hence, both ends of the tape T are bound together by a binding force of the synthetic resin material generated from the melted portion. Furthermore, the binding heating cable unit 35 having the binding heating cable 34 is detachably attached to the holder 36. Therefore, when electrodes of the binding heating cable unit 35 are respectively put into the anode and cathode of a power socket disposed on the holder 36, the binder can simply receive electric power from the holder 36, and shows an effect that the binding heating cable 34 is replaced with a new one by separating the binding heating cable unit 35 from the holder 36 like a fuse in the case that the binding heating cable 35 is broken during use (In this instance, it is obvious that those skilled in the art can unite the binding heating cable unit 35 and the holder 36 on their judgment.).

Accordingly, the binder having the binding heating cable 34 can solve the problems of the conventional binder using the stapler 30 having the staples, that continuously supplies the staples for a continuous use and that the user must stop work when the staples are fit into the stapler 30 in a bent state or are exhausted. Moreover, because the bind for horticultural use according to the present invention binds both ends of the tape T together by partially melting the tape T made of synthetic resin material not by the staples but by heat, it can use the tape T which is thinner than that of the conventional binder using the staples.

Figure 8:
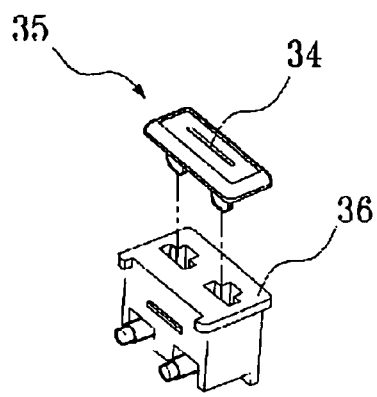
FIGS. 8(a) to 8(c) are partially perspective view of a binding heating cable of the binder for horticultural use according to the present invention.
Figure 8:
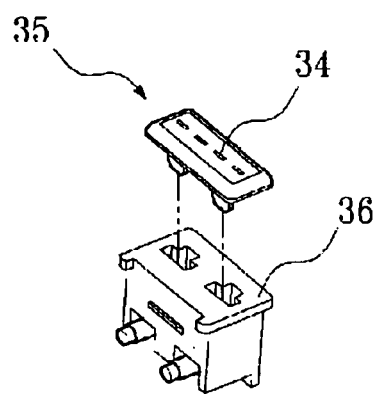
Figure 8:
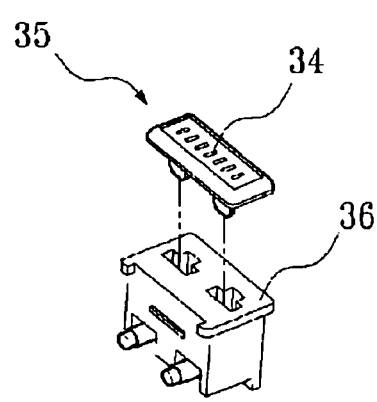
Figure 9:
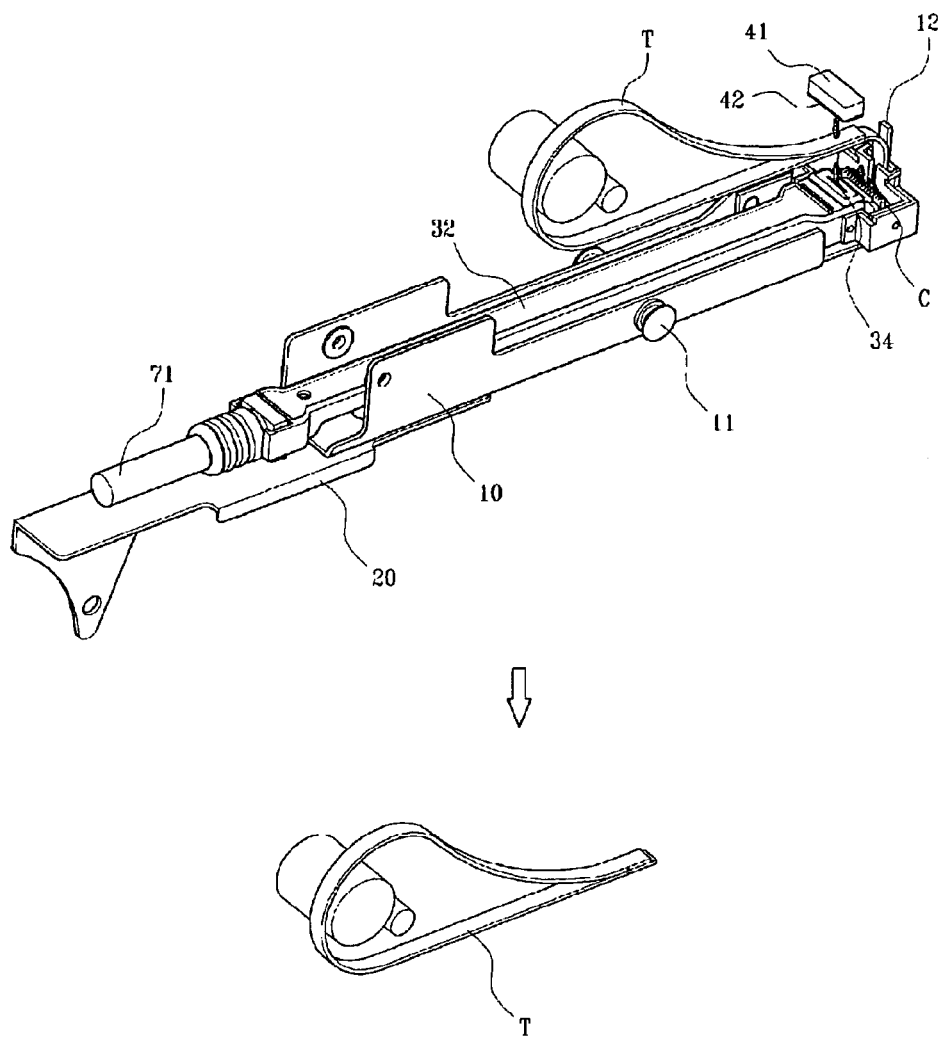
FIG. 9 is a partially perspective view showing an operational state of the taper of the binder for horticultural use according to the present invention.
Figure 10:
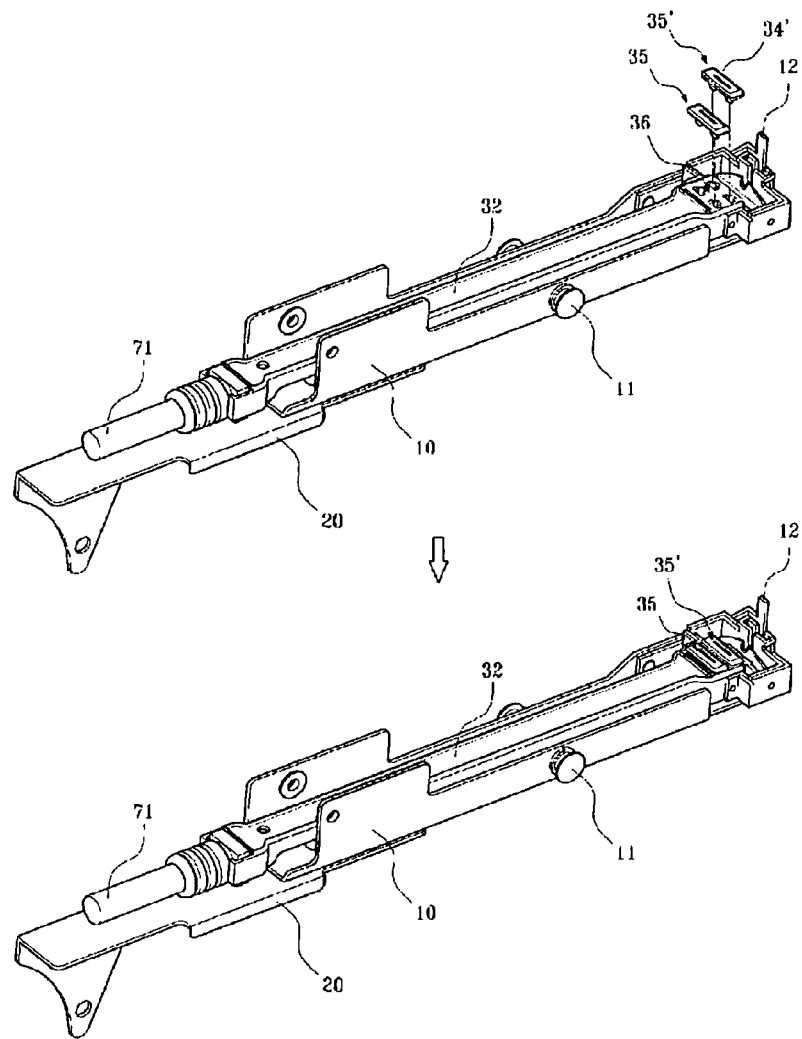
FIG. 10 is a partially perspective view showing the taper of the binder for horticultural use according to the present invention (in the case that the binding heating cable is disposed).
Figure 11:
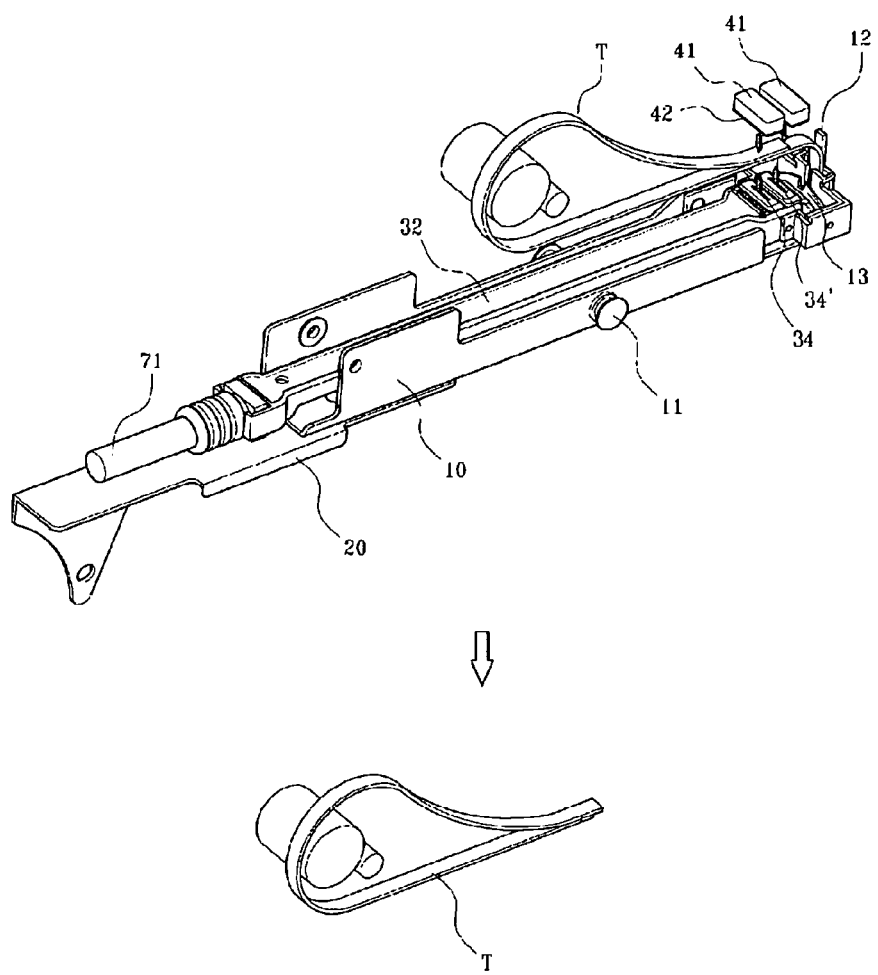
FIG. 11 is a partially perspective view showing the operational state of the taper of the binder for horticultural use according to the present invention (in the case that the binding heating cable is disposed).
Figure 12:
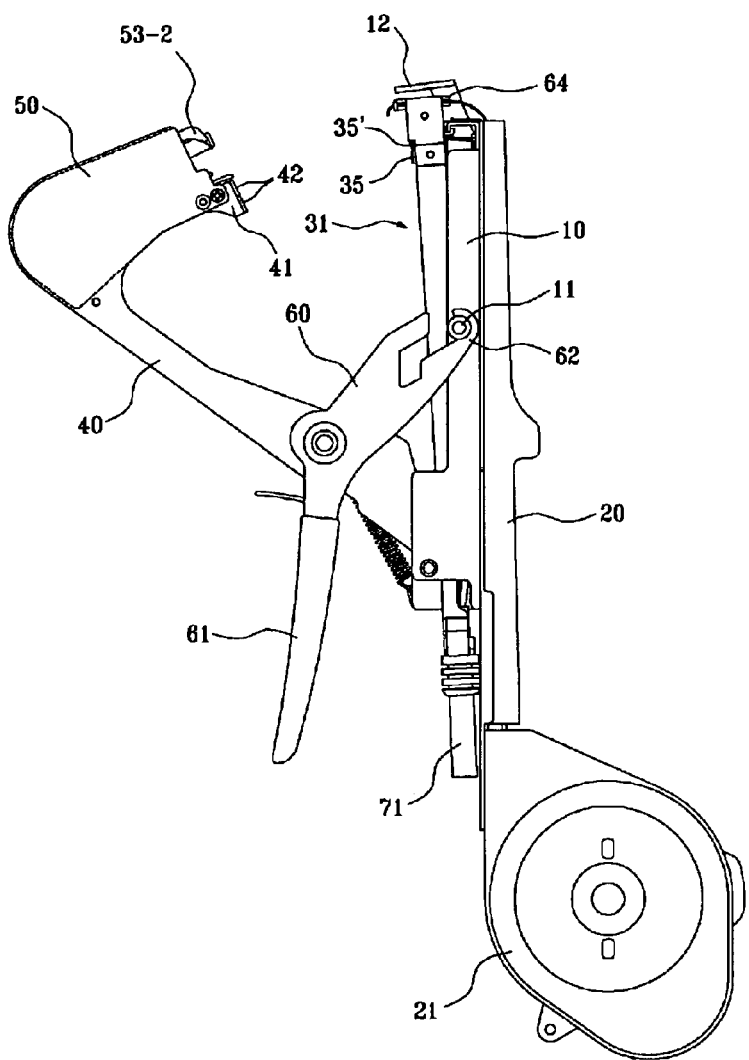
FIG. 12 is a side view of the binder for horticultural use according to the present invention (in the case that the binding heating cable is disposed).
Figure 13:
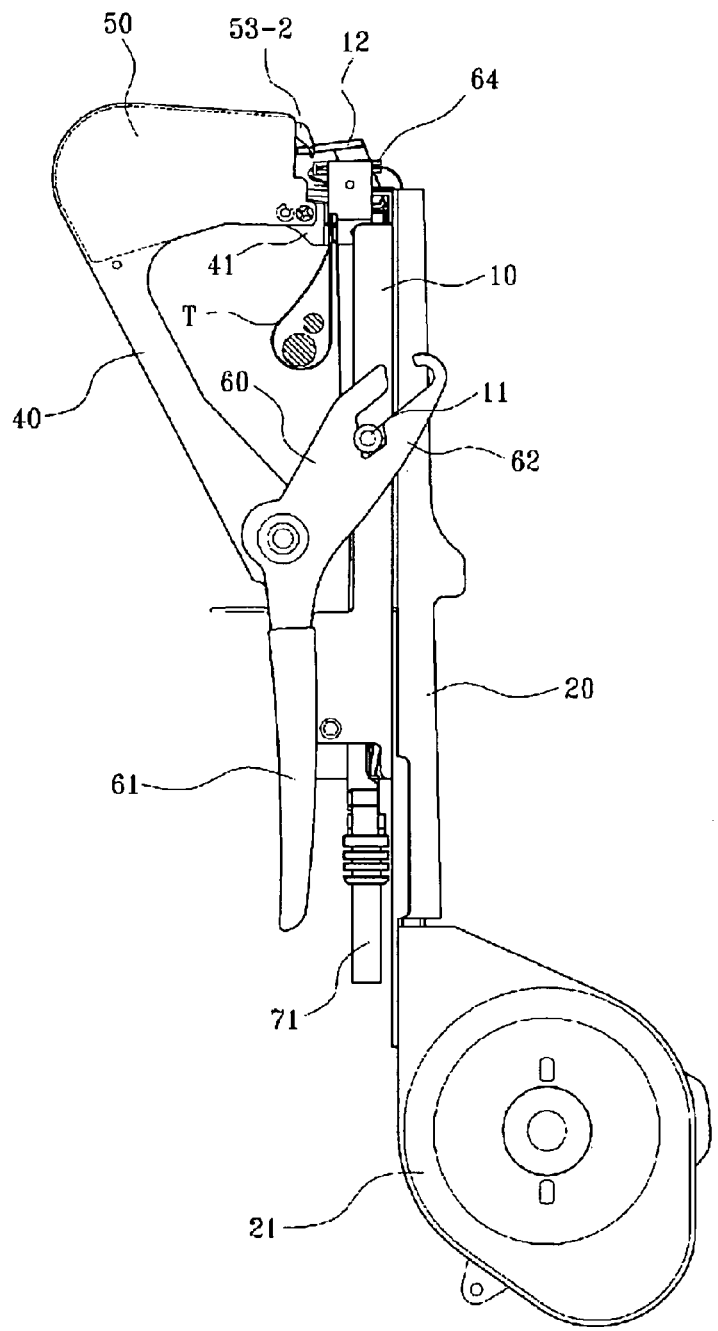
FIG. 13 is a side view showing the operational state of the binder for horticultural use according to the present invention (in the case that the binding heating cable is disposed).

Furthermore, as shown in FIGS. 8(*a*) to 8(*c*), because the binding heating cable 34 is formed in the shape of consecutive dashed lines or parallel dashed lines and the bound portion of the tape T bound by heat generated from the binding heating cable 34 is partially melted, both ends of the tape T can be bound together smoothly without regard to volume of the electric current applied to the binding heating cable 34 or temperature of heat generated from the binding heating cable 34 due to resistance of the binding heating cable.

Additionally, because the clincher 41 can apply a pressurizing force of a predetermined amount to both ends of the tape T when the binding heating cable 34 is located just on the corresponding face of the binding heating cable 34, it can solve the problem of the conventional binder that the staples can bind both ends of the tape T properly only when the staples supplied from the stapler 30 and the staple grooves of the clincher 41 of the arm are exactly coincided with each other. In connection with the above, the clincher 41 according to the present invention partially accommodates the both ends of the tape T and the binding heating cable 34 corresponding in a direction of the clincher 41 and being pressurized by the clincher 41 when pressurizing the handle 61 to tighten the arm 40 because the clincher 41 has an elastic force of a predetermined amount at the face opposed to the binding heating cable 34 of the taper 31, and may further include a nonflammable elastic body 42 with minor transformation and damage even by heat generated from the binding heating cable 34.

In addition, besides the binding heating cable unit 35 having the binding heating cable 34 for thermally binding both ends of the tape T, which are introduced between the binding heating cable 34 and the clincher 41 and are wound on the branches of the crops and the props and the guiding strings, as shown in FIGS. 10 to 13, instead of the cutter blade C disposed at the end of the handle frame 10, the binder further includes a cutting heating cable unit 35' having a cutting heating cable 34' which receives an electric current of a predetermined amount from the power supply unit 70. In this instance, the holder 36 can detachably hold the cutting heating cable unit 35' as well as the binding heating cable unit 35, and the clincher 41 is also opposed to the cutting heating cable 34' so as to cut both ends of the tape T introduced between the cutting heating cable 34' and the clincher 41. In other words, electrodes of the cutting heating cable unit 35' are respectively put into the anode and cathode of the power socket of the holder 36 for connecting the electrodes of the binding heating cable unit 35 and the electrodes of the cutting heating cable unit 35', so that the binder can easily receive electric power from the holder 36, and the cutting heating cable 34' is replaced with a new one by separating the cutting heating cable unit 35' from the holder 36 in the case that the cutting heating cable 35' is broken during use. In comparison with the conventional binder which cuts both ends of the tape T using the cutter blade C, the binder according to the present invention needs a smaller power than the conventional binder when the user grasps and pressurizes the handle 61.

Figure 14:
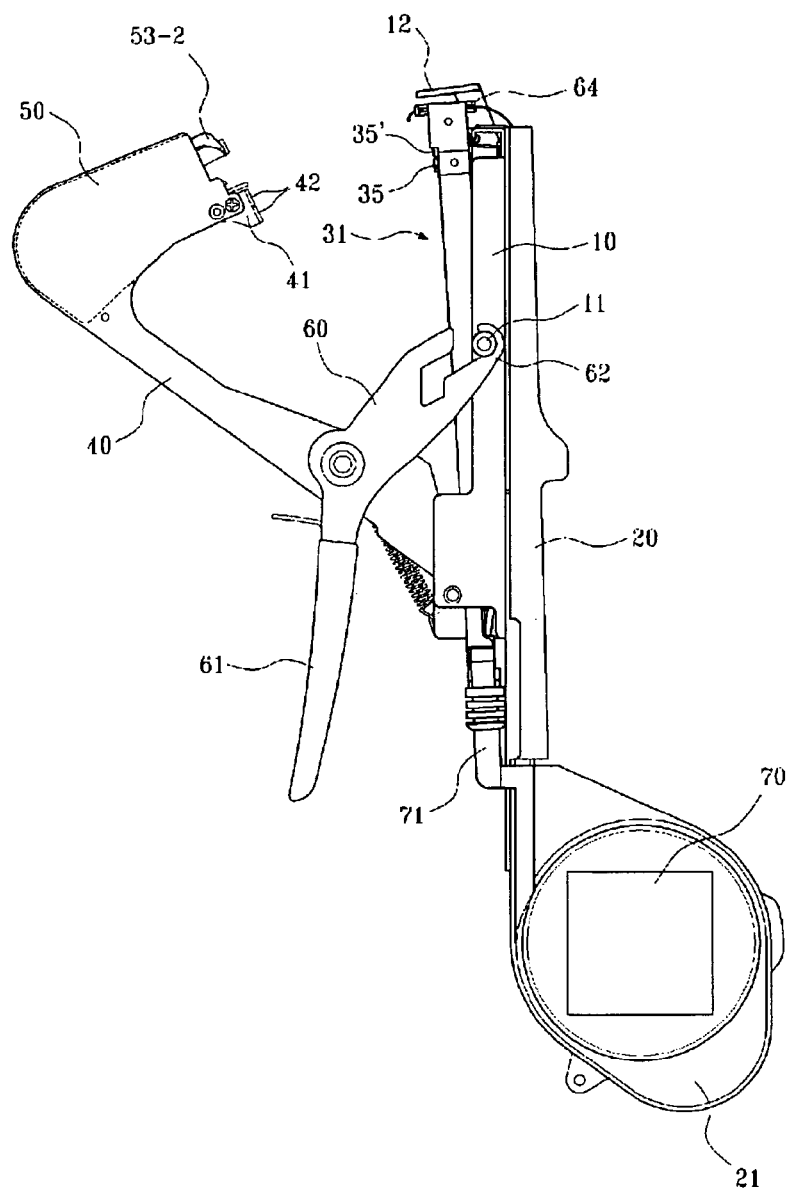
FIG. 14 is a side view of the binder for horticultural use according to the present invention (in the case that a power supply unit is mounted on a tape case).

In relation with the above, the power supply unit 70 according to the present invention supplies the electric current of a predetermined amount to the holder 36 to which the electrodes of the binding heating cable unit 35 having the binding heating cable 34 or the cutting heating cable unit 35' having the cutting heating cable 34' in order to supply electric power of the predetermined amount to the binding heating cable 34 or the cutting heating cable 34'. In this instance, the supplied electric current may be supplied through any part of the binder for horticultural use according to the present invention, but it is preferable that an electric wire is disposed inside the taper frame 32 so that electric current is safely supplied to the holder from the power supply unit 70 which is disposed outside the binder for horticultural use according to the present invention. Moreover, it is preferable that the power supply unit 70 disposed outside the binder uses a primary cell or a secondary cell so that the user can work smoothly and the electric wire 71 is elongated as long as the user can hold it. As shown in FIG. 14, the power supply unit 70 may be disposed at one side of the tape case 21 in such a way as to be formed integrally with the binder for horticultural use, and hence, it can enhance workability through the simplified power supply unit 70.

Furthermore, in order to control the amount and the supply period of time of the electric current supplied to the binding heating cable 34 or the cutting heating cable 34', a control module (not shown in the drawings) is mounted at a position of the power supply unit 70 or the binder for horticultural use, and then, the binder for horticultural use according to the present invention can supply a proper amount of electric current to the binding heating cable 34 for a proper period of time so as to firmly bind the tape T and can supply a proper amount of electric current to the cutting heating cable 34' for a proper period of time so as to cut a predetermined position of the tape T bound by the binding heating cable 34.

In this instance, in order to prevent that both ends of the tape T are bound weakly by the binding heating cable 34 or imperfectly cut by the cutting heating cable 34' when the electric voltage stored in the primary cell or the secondary cell is decreased due to a continuous use of the binder for horticultural use, the control module can control the electric voltage.

The binder for horticultural use according to the present invention may further include an operation sensor 37 which is mounted between the taper frame 32 and the handle frame 10 to control supply of the electric current to the binding heating cable 34 or the cutting heating cable 34'. Concretely, electric current is excessively consumed and the lifespan of the binding heating cable 34 or the cutting heating cable 34' may be reduced if the electric current supplied from the power supply unit 70 is always supplied to the binding heating cable 34 or the cutting heating cable 34' during work. Therefore, it is preferable that the operation sensor 37 for controlling the supply of the electric current from the power supply unit 70 is disposed in link with any part of the binder. In the binder for horticultural use according to the present invention, the operation sensor 37 is interposed between the taper frame 32 and the handle frame 10 so as to be operated by the user's pressing force applied to the handle 61 to bind both ends of the tape T together.

Figure 7:
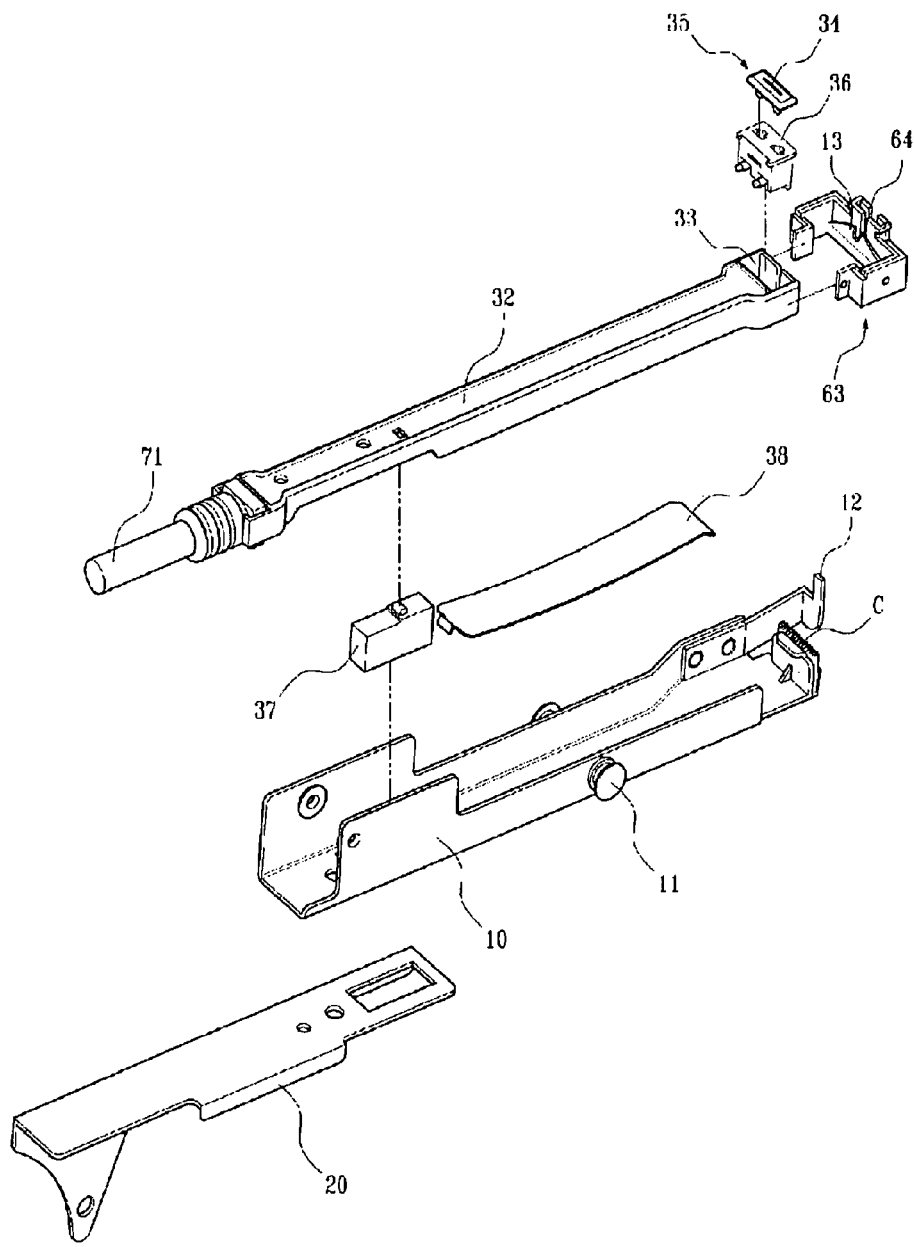
FIG. 7 is a partially perspective view showing an exploded state of a taper and a handle frame of the binder for horticultural use according to the present invention.

Additionally, as shown in FIG. 7, the binder may further include an elastic member 38 disposed between the taper frame 32 and the handle frame 10. The elastic member 38 buffs some of the user's pressing force applied to the handle 61 to bind both ends of the tape T together, such that it can prevent the clincher 41 and the binding heating cable unit 35 or the clincher 41 and the cutting heating cable unit 35' from being damaged due to an excessive pressing force and that it makes the operation sensor 37 be operated by not only a sensor-operation method but also a switching method in the case that the operation sensor 37 is disposed between the taper frame 32 and the handle frame 10.

In addition, the head 50 is embedded in an upper portion of the arm 40, and the hook lever 53 is rotatably operated to catch and draw out the front end portion of the tape T. Moreover, the link 60 is rotatably mounted on the arm 40, has the handle 61 disposed at one side thereof for allowing the user to grasp it with then hand and the hook 62 disposed at the other side so as to be joined to the pin 11 of the handle frame 10.

In the binder for horticultural use having the above structure, when the user grasps the tape guide 20 and the handle 61 with the hand and pressurizes the handle 61 to tighten the arm 40 slightly once, the front end of the tape T drawn out from the tape case 21 through the tape guide 20 is caught to the hook lever 53 and the support 57 of the head 50 mounted on the arm 40, and in this condition, when the user releases the pressurizing force to the handle 61 to open the arm 40, the tape T is drawn out in the state where the tape T is caught to the hook lever 53 and the support 57 of the head 50. After that, when the user winds the tape T onto the branches of the crops and the props or the guiding strings and pressurizes the handle 61 with a stronger power to tighten the arm 40, while the clincher 41 is pressed to the binding heating cable 34, both ends of the tape T wound on the branches of the crops and the props or the guiding strings are bound together by heat, and at the same time, the tape T is cut by the cutter blade C mounted on the handle frame 10. (In the case that the cutting heating cable 34' is mounted instead of the cutter blade, it is obvious that the tape is cut by the cutting heating cable, and hereinafter, 'cutter blade' means that it contains the cutting heating cable.)

Accordingly, after the tape T is wound on the branches of the crops and the props or the guiding strings, the tape T is bound by the binding heating cable 34 and the clincher 41 and is cut by the cutter blade C, and hence, the branches of the crops are bound to the props or the guiding strings by the tape T so that the crops can grow properly.

Next, essential parts of the head 50 of the binder for horticultural use according to the present invention will be described. The head 50 of the binder includes: a case having an upper case 51 and a lower case 52; a hook lever 53 mounted inside the case and fit to a tension spring 53-5 in such a way as to be operated rotatably; a cam plate 54 mounted inside the case and having a cam hole 54-1; a first guide 55 mounted inside the case and having a retainer 55-3 to which a cam hole 55-1 and a spring 55-5 are fit; a second guide 56 mounted inside the case and having a retainer 56-3 to which a cam hole 56-1 and a spring 56-5 are fit; a support 57 mounted inside the case; a rotational lever 58 mounted inside the case and rotated by operation of the first guide 55 and the second guide 56; and a push lever 59 mounted inside the case and going into and out of the case by operation of the rotational lever 58.

Figure 15:
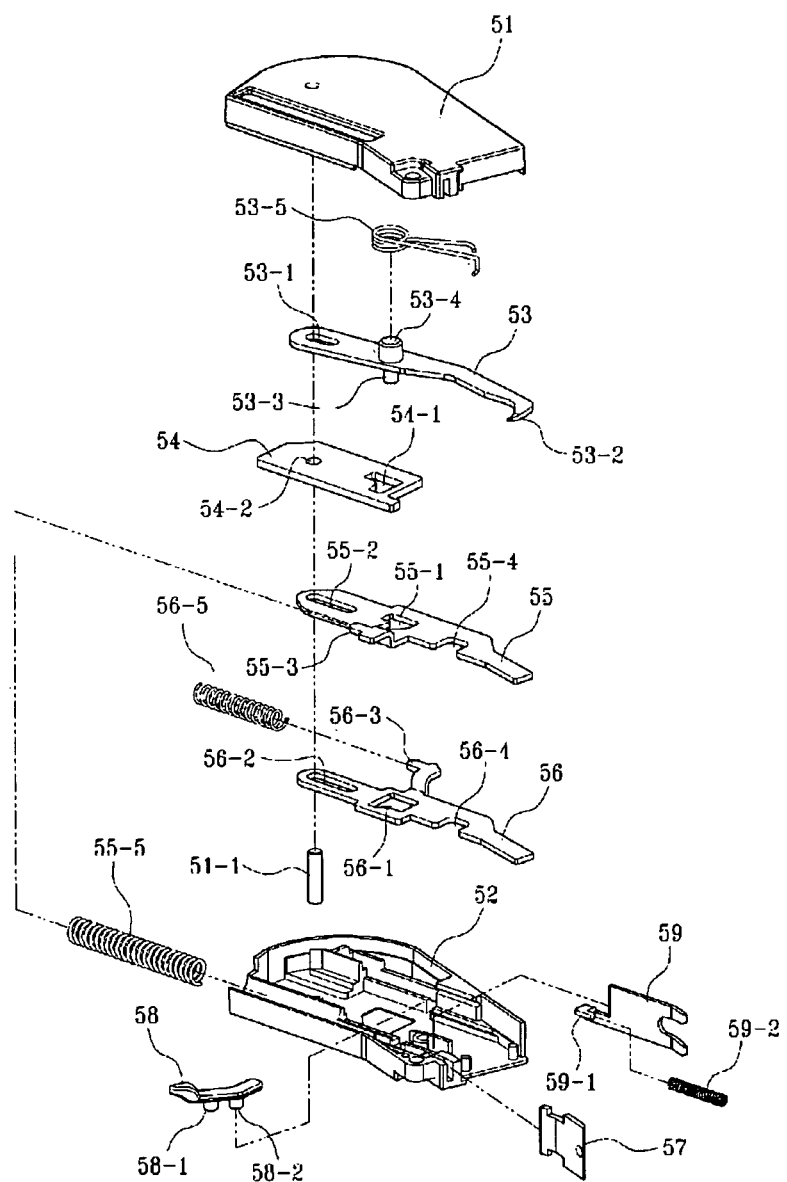
FIG. 15 is an exploded perspective view of a head of the binder for horticultural use according to the present invention.
Figure 16:
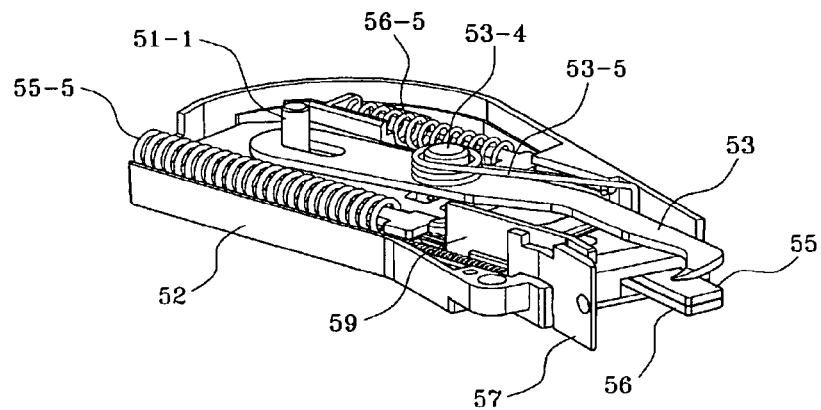
FIG. 16 is a perspective view showing an assembled state of the head of the binder for horticultural use according to the present invention.
Figure 17:
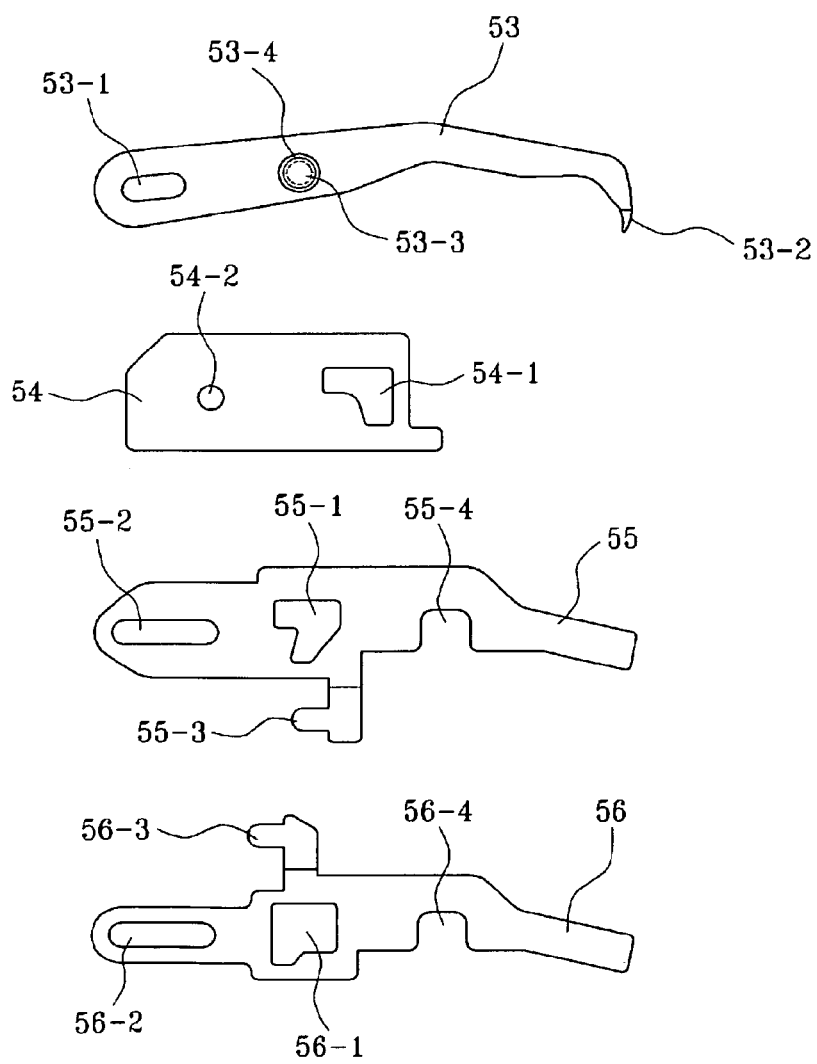
FIG. 17 is a side view showing essential components of the head of the binder for horticultural use according to the present invention.

As shown in FIGS. 15 to 17, the case of the head 50 has the upper case 51 and the lower case 52, a pin 51-1 is fit to the upper case 51 and the lower case 52, and the hook lever 53, the cam plate 54, the first guide 55, the second guide 56, the support 57, the rotational lever 58 and the push lever 59 are mounted inside the upper case 51 and the lower case 52.

The hook lever 53 includes: an elongated hole 53-1, which is formed at one side thereof, and, to which the pin 51-1 is fit; a hook 53-2 formed at a front end of the opposite side; an operation pin 53-3 and a fixing shaft 53-4 formed symmetrically to each other at the central portion; and the tension spring 53-5 fit onto the fixing shaft 53-4.

Moreover, the cam plate 54 is arranged below the hook lever 53, and includes: the cam hole 54-1 formed at one side in a shape of

to which the operation pin 53-3 is fit; and a joining hole 54-2 formed at the other side, to which the pin 51-1 is fit.

Furthermore, the first guide 55 is arranged below the cam plate 54, and includes: the cam hole 55-1 formed at the central portion thereof in a shape of

to which the operation pin 53-3 of the hook lever 53 is fit; an elongated hole 55-2 formed in one side thereof, to which the pin 51-1 is fit; the retainer 55-3 formed below the cam hole 55-1 and supported by the spring 55-5 fit thereto; and a recess 55-4 formed in the opposite side of the elongated hole 55-2.

Additionally, the second guide 56 is arranged below the first guide 55, and includes: the cam hole 56-1 formed at the central portion thereof in a shape of

to which the operation pin 53-3 of the hook lever 53 is fit; an elongated hole 56-2 formed in one side thereof, to which the pin 51-1 is fit; the retainer 56-3 formed above the cam hole 56-1 and supported by the spring 56-5 fit thereto; and a recess 56-4 formed in the opposite side of the elongated hole 56-2.

Moreover, the support 57 serves to catch the tape T by engaging with the hook lever 53, and is mounted and fixed inside the front end portion of the case in such a way as to be opposed to the stopper 12 of the handle frame 10 and the binding heating cable 34.

Furthermore, the rotational lever 58 is rotated according to the operations of the first guide 55 and the second guide 56, and includes: a first rotational pin 58-1 formed at the bottom face of the central portion thereof and rotatably assembled to the case; and a second rotational pin 58-2 formed at the bottom face of one side in such a way as to be inserted into the recesses 55-4 and 56-4 of the first guide 55 and the second guide 56.

Additionally, the push lever 59 serves to go into and out of the case according to the operation of the rotational lever 58, and includes the retainer 59-1 movably fit between the front end portion of the case and the upper portion of the support 57 and supported by the spring 59-2 fit at the rear end portion thereof.

Now, an assembling process of the head 50 having the above structure will be described. First, the pin 51-1 is fit into the elongated hole 56-2 in such a fashion that the second guide 56 is mounted inside the lower case 52, and the first guide 55 is put on the second guide 56 and the pin 51-1 is fit into the elongated hole 55-2. After that, the springs 55-5 and 56-5 are respectively fit to the retainers 55-3 and 56-3 of the first guide 55 and the second guide 56 so as to elastically support the retainers 55-3 and 56-3, and then, the rotational lever 58 is fit to the lower case 52 in such a fashion that the rotational pin 58-2 is inserted into the recesses 55-4 and 56-4 of the first guide 55 and the second guide 56.

Next, the cam plate 54 is put on the first guide 55 and the pin 51-1 is inserted into the joining hole 54-2, and the hook lever 53 is elastically mounted on the cam plate 54 in such a fashion that the pin 51-1 is fit into the elongated hole 53-1, the operation pin 53-3 is fit into the cam holes 54-1, 55-1 and 56-1 formed in the cam plate 54, the first guide 55 and the second guide 56, and the tension spring 53-5 is fit to the fixing shaft 53-4.

Moreover, the support 57 is mounted below the front end portions of the upper case 51 and the lower case 52, and then, the push lever 59 is movably fit on the support 57 in such a way as to receive the elastic force of the spring 59-2.

Figure 18:
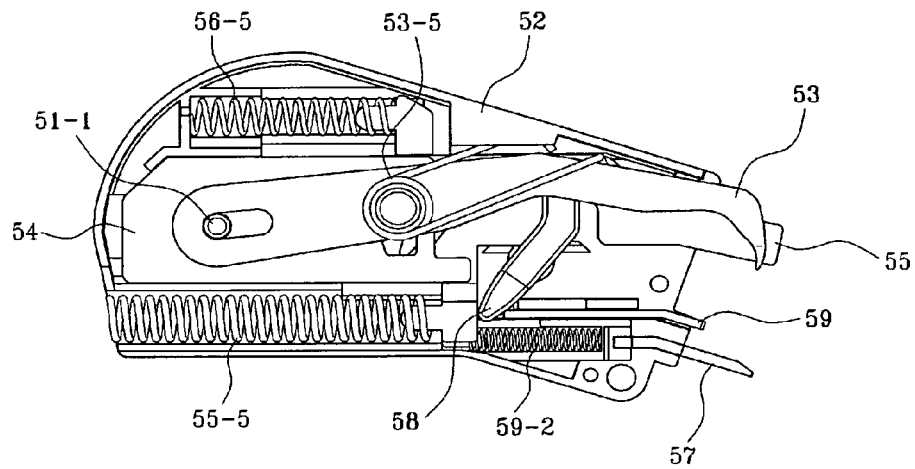
FIGS. 18 and 19 are views showing an initially operational state of the head of the binder for horticultural use according to the present invention.
Figure 19:
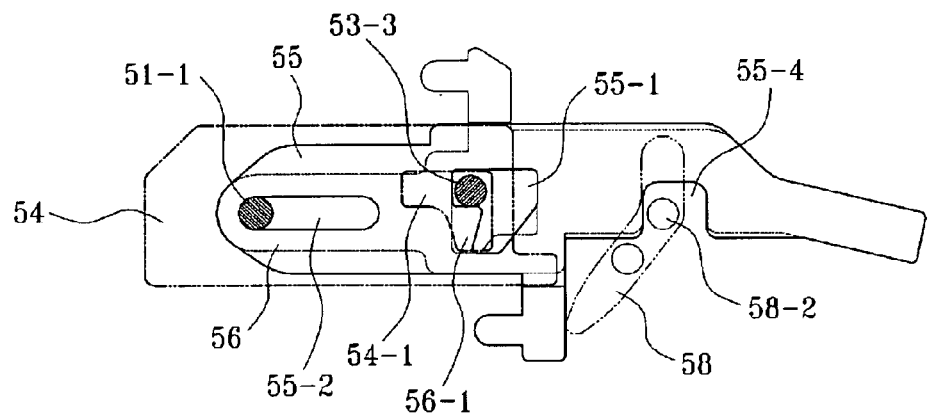

Now, an operation process of the head 50 will be described. First, in the initial state of the head 50, the arm 40 is in an opened state, and as shown in FIGS. 18 and 19, the operation pin 53-3 of the hook lever 53 is caught to an upper stepped jaw of the cam hole 55-1 of the first guide 55, so that the hook lever 53 is in a upwardly rotated state.

Figure 20:
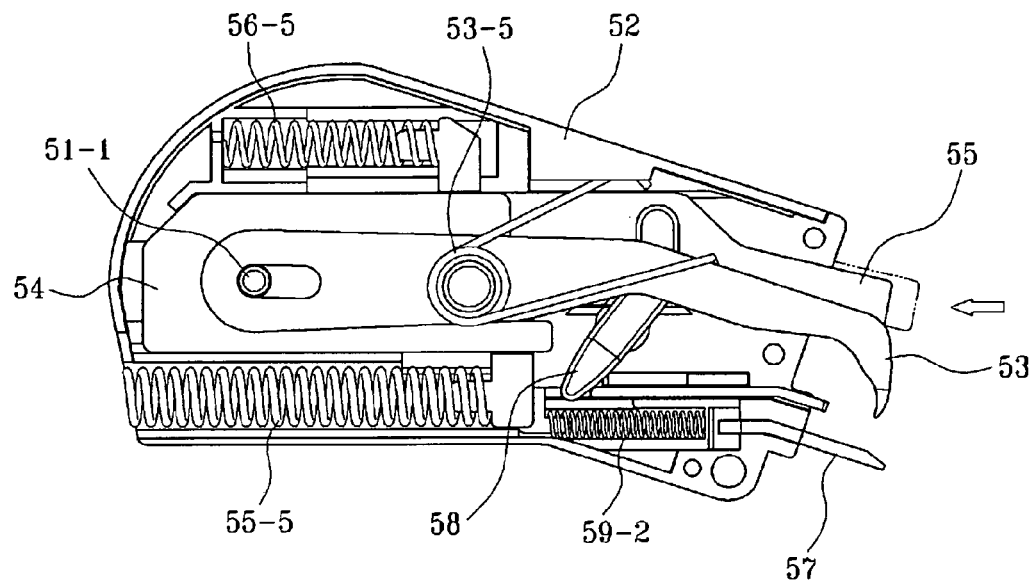
FIGS. 20 and 21 are views showing the first stage operational state of the head of the binder for horticultural use according to the present invention.
Figure 21:
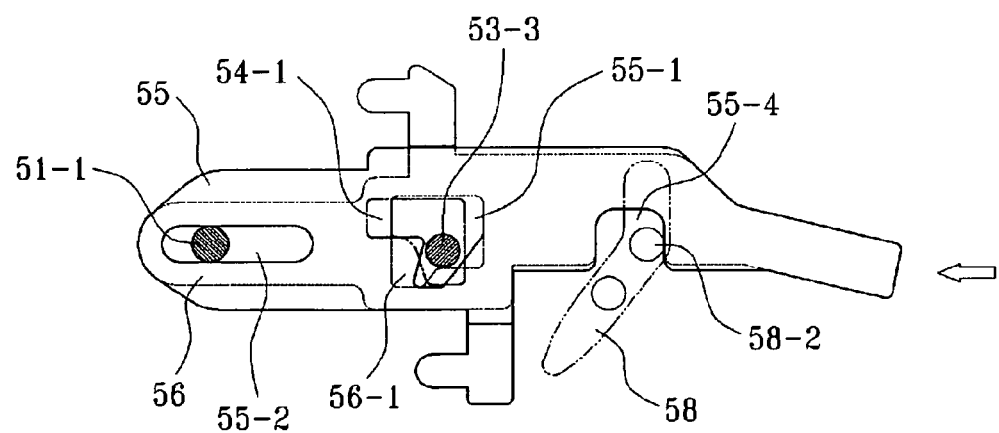
Figure 22:
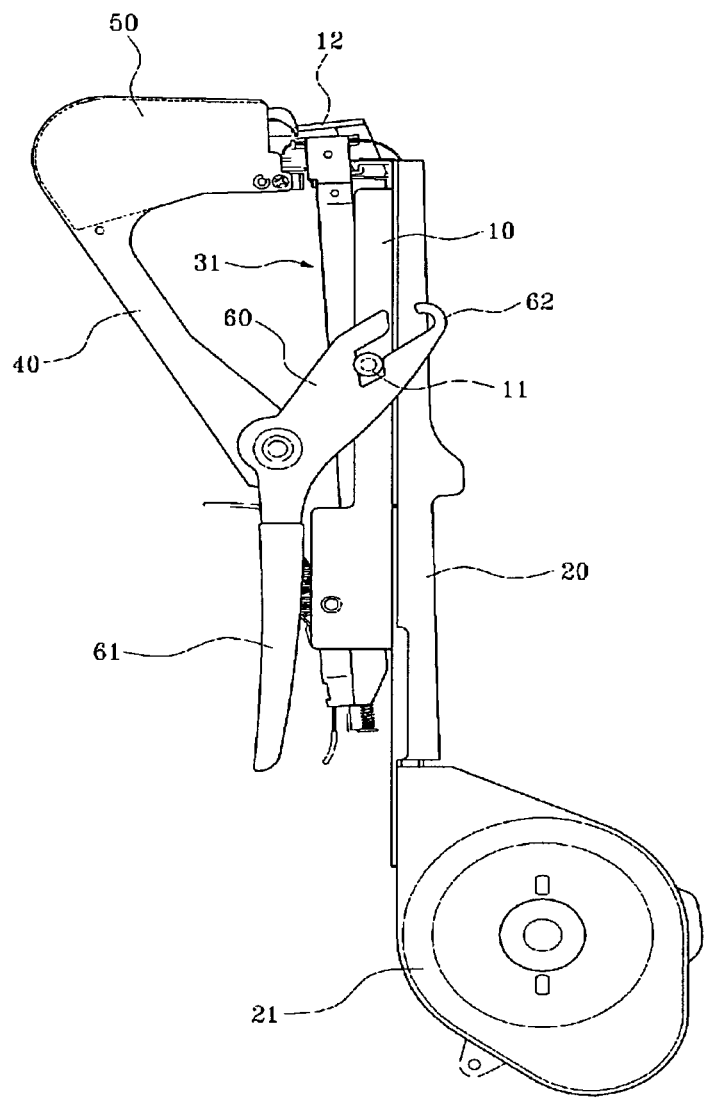
FIG. 22 is a side view showing the first stage operational state of the binder for horticultural use according to the present invention.

In the above initial state, when the user pressurizes the handle 61 of the binder to slightly tighten the arm 40 once, as shown in FIGS. 20 to 22, the first guide 55 and the second guide 56 are pressurized to the stopper 12 of the handle frame 10 and pushed backward, and then, the operation pin 53-3 of the hook lever 53 lowers and is first rotated while being caught to a lower stepped jaw of the cam hole 56-1 of the second guide 56.

Figure 23:
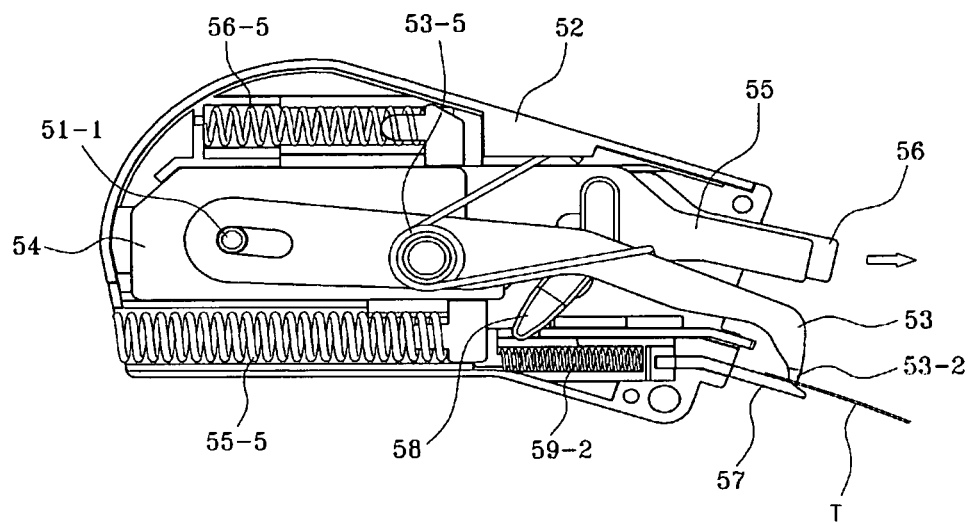
FIGS. 23 and 24 are views showing the second stage operational state of the head of the binder for horticultural use according to the present invention.
Figure 24:
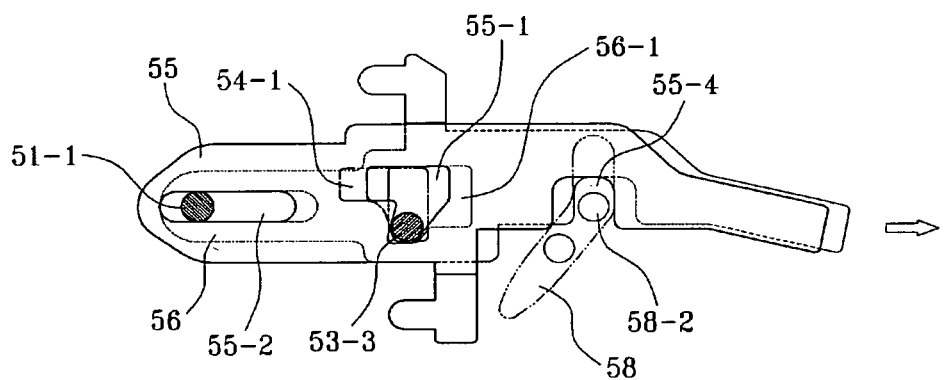
Figure 25:
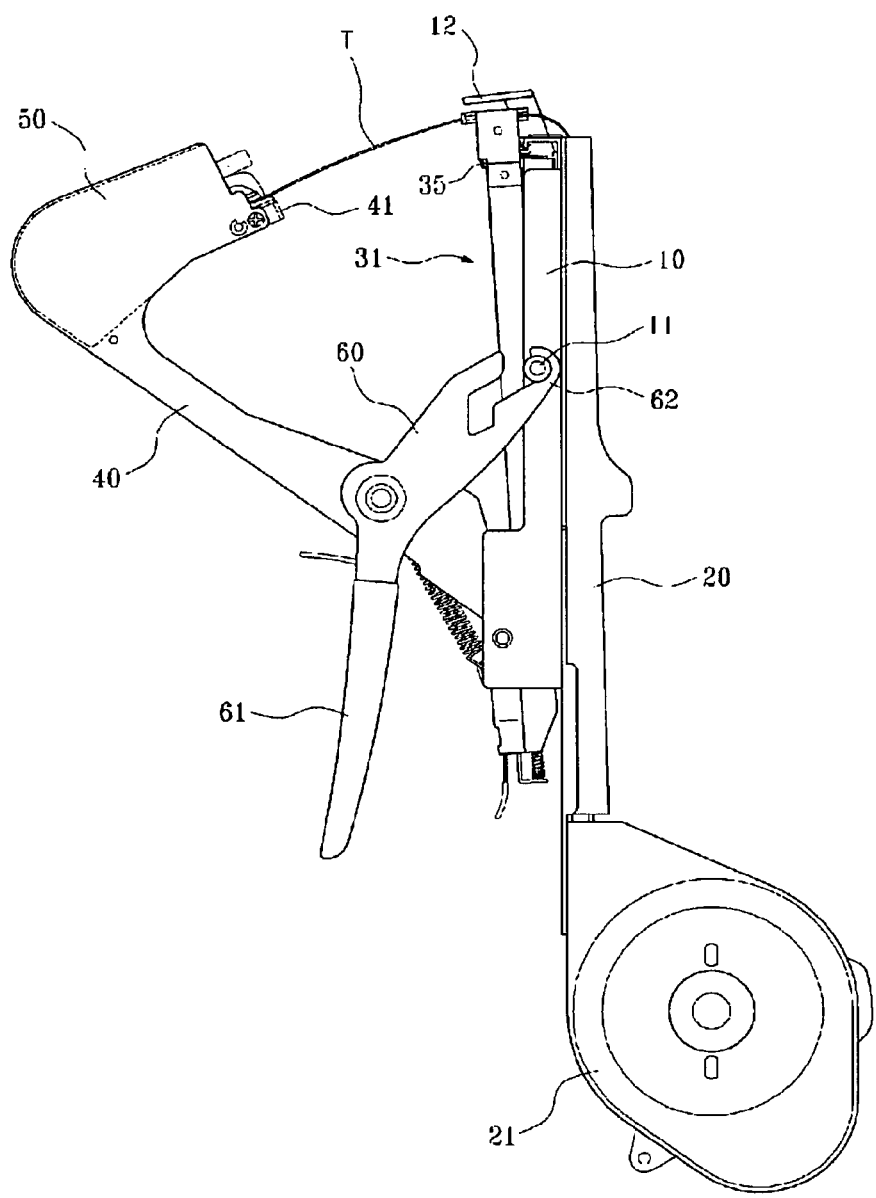
FIG. 25 is a side view showing the second stage operational state of the binder for horticultural use according to the present invention.
Figure 26:
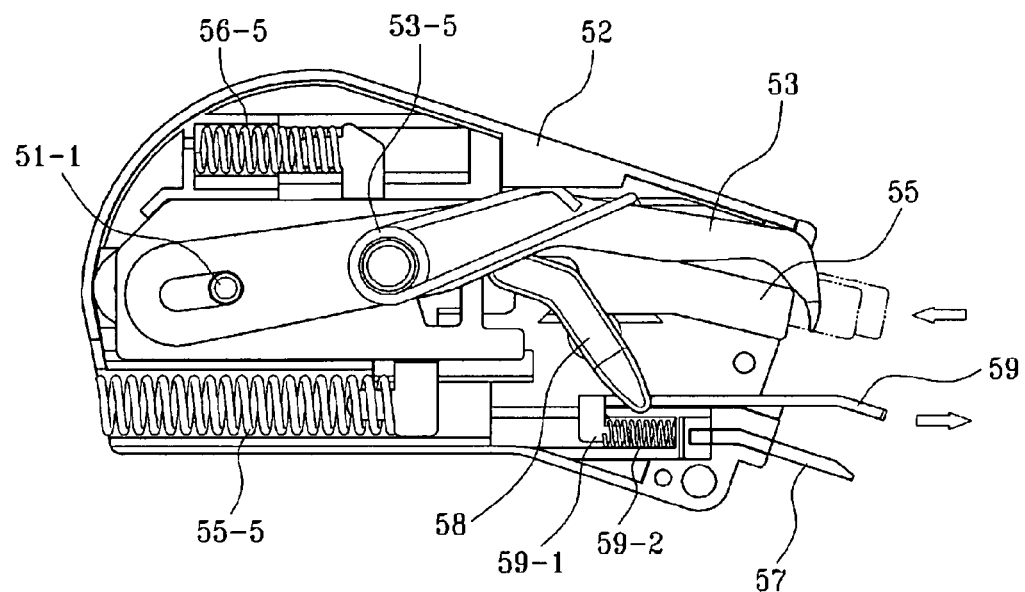
FIGS. 26 and 27 are views showing the third stage operational state of the head of the binder for horticultural use according to the present invention.
Figure 27:
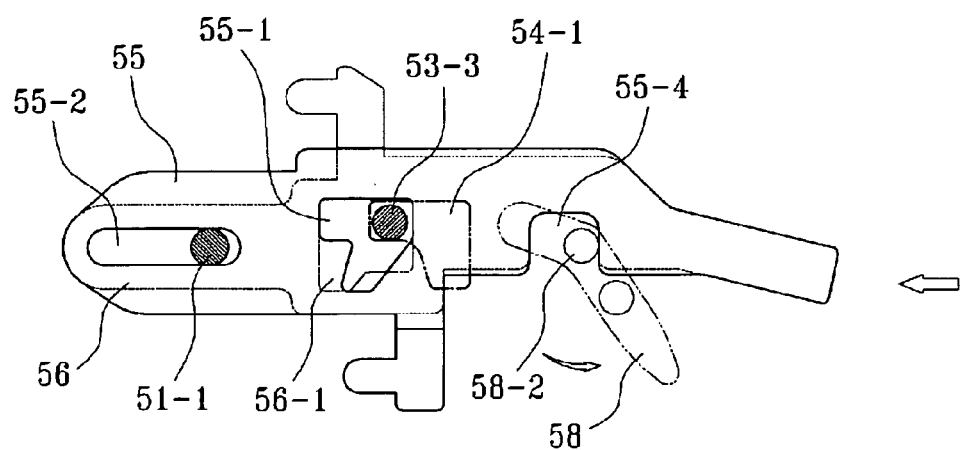
Figure 28:
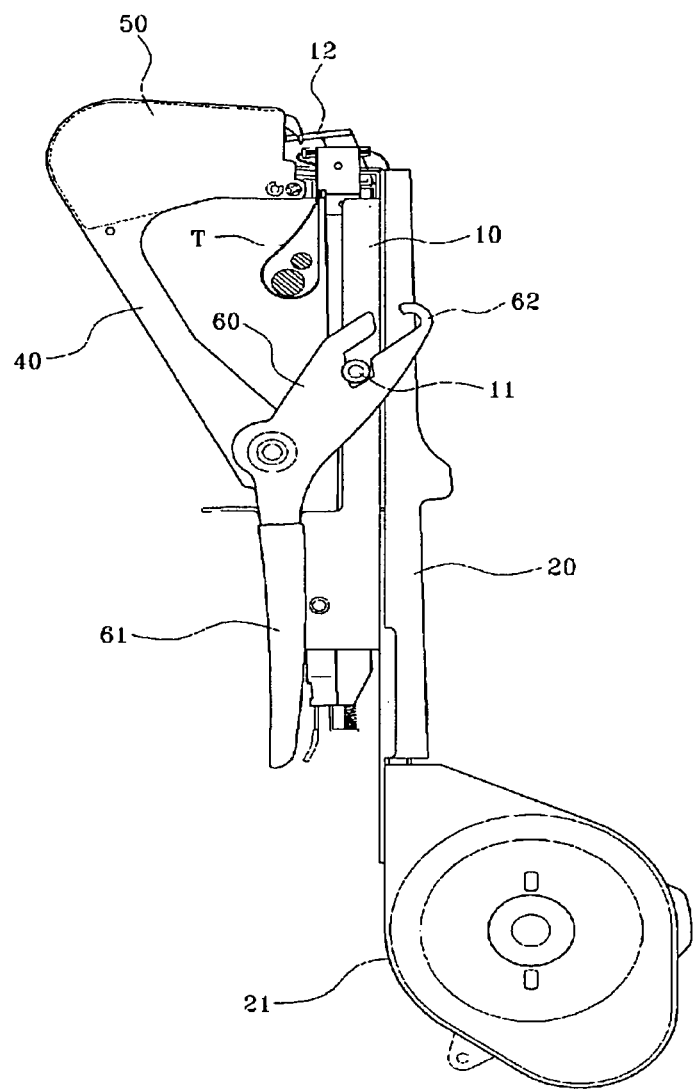
FIG. 28 is a side view showing the third stage operational state of the binder for horticultural use according to the present invention.
Figure 29:
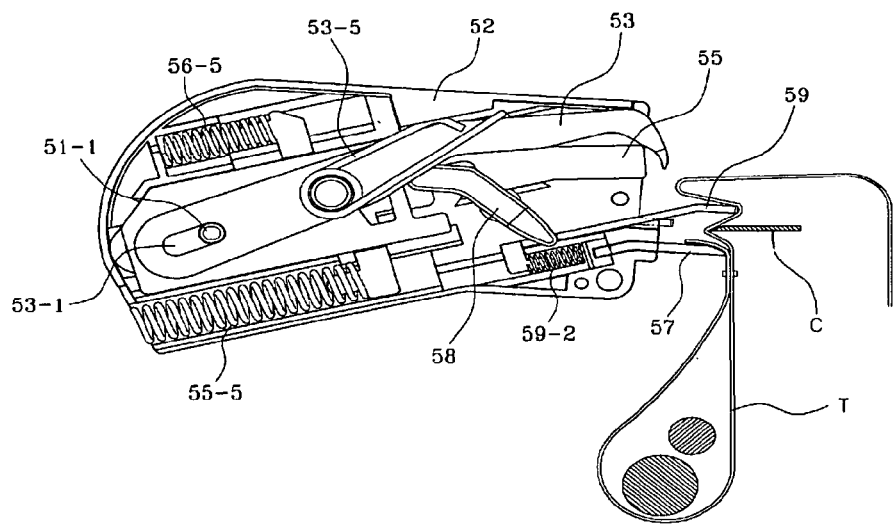
FIG. 29 is a side view of essential parts showing the third stage operational state of the binder for horticultural use according to the present invention.

Next, when the user releases the pressurizing force to the handle 61, as shown in FIGS. 23 to 25, the pressurizing force is disappeared because the stopper 12 of the handle frame 10 is spaced away from the first guide 55 and the second guide 56, and hence, the first guide 55 and the second guide 56 are pushed forward by the elastic force of the springs 55-5 and 56-5. Then, the operation pin 53-3 of the hook lever 53 lowers from the cam holes 55-1 and 56-1 of the first guide 55 and the second guide 56 to a lower space. When the hook lever 53 is second rotated, the hook 53-2 sticks the front end portion of the tape T so that the tape T is caught to the support 57. After that, because the arm 40 is opened to drag the tape T, the tape T is drawn out from the tape case 21 through the tape guide 20.

Next, as shown in FIGS. 26 to 29, when the user winds the drawn tape T onto the branches of the crops and the props or the guiding strings and pressurizes the handle 61 of the binder with a stronger power to tighten the arm 40, the clincher 41 is pressurized to the binding heating cable 34 and both ends of the tape T wound on the branches of the crops and the props or the guiding strings are bound together by heat.

Furthermore, the first guide 55 and the second guide 56 are pressurized to the stopper 12 of the handle frame 10 and pushed backward, and hence, the operation pin 53-3 of the hook lever 53 is ascended from the cam hole 54-1 of the cam plate 54 to the upper stepped jaw. Then, the hook lever 53 is separated from the tape T while rotating upward, and at the same time, the rotational lever 58 is rotated by the operation of the first guide 55 and the second guide 56 to thereby push out the push lever 59, and then, the front end portion of the push lever 59 presses the tape T to the cutter blade C to thereby cut the tape T.

Figure 30:
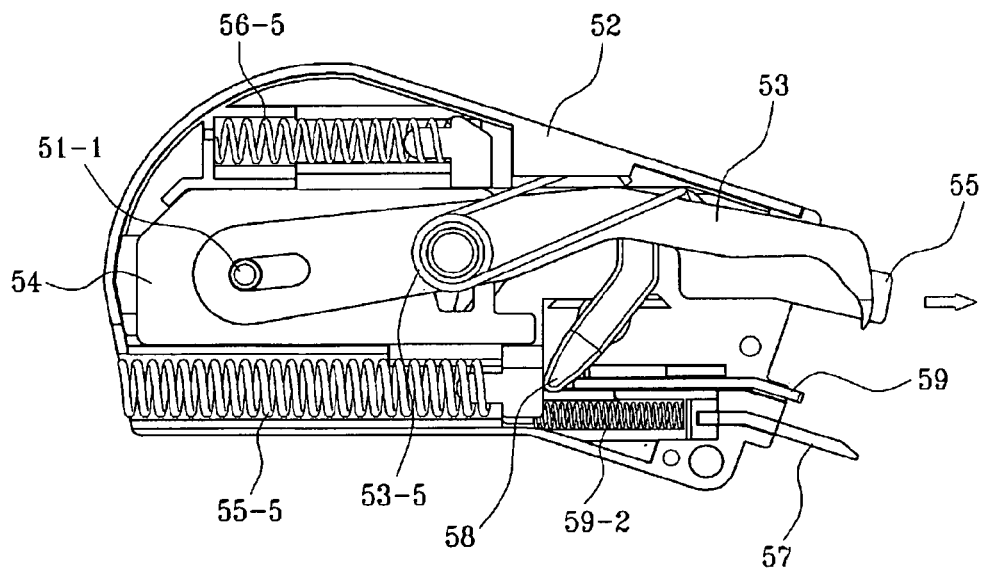
FIGS. 30 and 31 are views showing the fourth stage operational state of the head of the binder for horticultural use according to the present invention.
Figure 31:
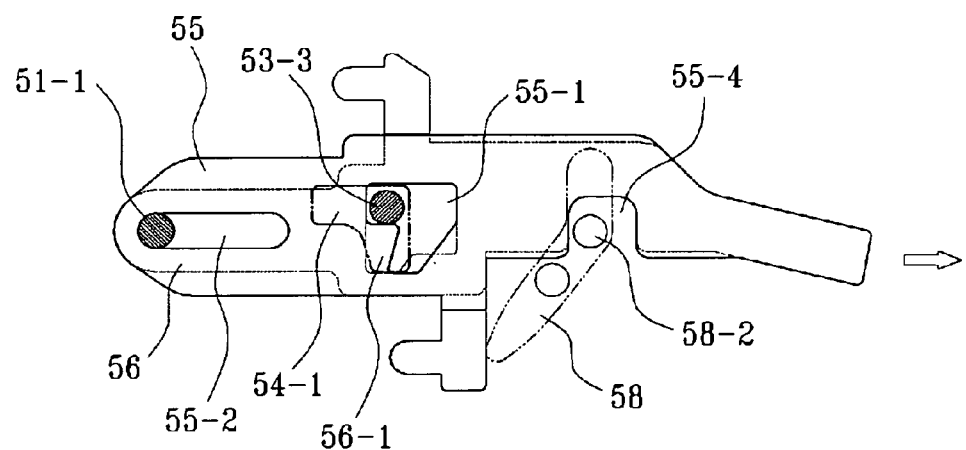

Next, when the user releases the pressurizing power to the handle 61, while the arm 40 is opened, as shown in FIGS. 30 and 31, because the stopper 12 is separated from the first guide 55 and the second guide 56 and the pressurizing power is disappeared, the first guide 55 and the second guide 56 is pushed forward while receiving the elastic force of the springs 55-5 and 56-5, and then, the operation pin 53-3 of the hook lever 53 is caught to the upper stepped jaw of the cam hole 55-1 of the first guide 55 and is positioned in the initial state. At the same time, the rotational lever 58 pulls the push lever 59 to the inside of the case so that the push lever 59 is located in the initial state while being rotated by the operation of the first guide 55 and the second guide 56 so as to be located in the initial state.

Accordingly, the binder for horticultural use according to the present invention can reduce a damage of the tape and securely catch and draw out the tape through a smooth operation of the hook lever because the hook lever is smoothly operated in the head step by step to catch and draw out the tape, and provide a smooth cutting of the tape and enhance durability by preventing a damage and transformation of the push lever while working because the push lever protrudes outwardly from the head and presses the tape to the cutter blade only when the tape is cut.

While the present invention has been particularly shown and described with reference to exemplary embodiment thereof, it will be understood by those of ordinary skill in the art that various changes in form and details may be made therein without departing from the spirit and scope of the present invention as defined by the following claims.

The invention claimed is:

1. A binder for horticultural use comprising: a handle frame (10) having pins (11) protrudingly formed on both sides in the middle of the handle frame (10) and a stopper (12) outwardly protruding from a front end portion thereof; a tape guide (20) attached to a lower face of the handle frame (10) and having a tape case (21); a taper (31) rotatably mounted inside the handle frame (10); an arm (40) rotatably mounted on the handle frame (10) and having a clincher (41) at an end portion opposed to the taper (31); a head (50) mounted inside the arm (40) for catching and drawing out a tape (T); and a link (60) rotatably mounted on the arm (40) and having a handle (61) disposed at one side thereof and a hook (62) disposed at the other side thereof,
    wherein the taper (31) comprises:
        a taper frame (32) having a holder groove (33) disposed at one side thereof;
        a binding heating cable unit (35) having a binding heating cable (34) which is disposed so as to receive an electric current from a power supply unit (70); and
        a holder (36) to which the binding heating cable unit (35) is detachably attached, the holder (36) being inserted into the holder groove (33), and
    wherein the binding heating cable (34) is opposed to the clincher (41) for binding both ends of a tape (T), which is interposed between the binding heating cable (34) and the clincher (41), by heat.

2. The binder according to claim 1, wherein the handle frame (10) does not have a cutter blade (C), the taper (31) further comprises a cutting heating cable unit (35') having a cutting heating cable (34') receiving an electric current of a predetermined amount from the power supply unit (70), the holder (36) can detachably mount not only the binding heating cable unit (35) but also the cutting heating cable unit (35'), and the clincher (41) is also opposed to the cutting heat cable (34') to cut both ends of the tape (T), which is interposed between the cutting heating cable (34') and the clincher (41), by heat.

3. The binder according to claim 2, wherein the clincher (41) further comprises a nonflammable elastic body (42).

4. The binder according to claim 1 or 2, wherein the clincher (41) further comprises a nonflammable elastic body (42).

5. The binder according to claim 1, wherein the binding heating cable (34) is formed in a shape of dashed lines or parallel lines.

6. The binder according to claim 1, wherein the power supply unit (70) is disposed at one side of the tape case (21).

7. The binder according to claim 6, wherein the power supply unit (70) comprises a control module for controlling an amount and a supply period of time of the supplied electric current.

8. The binder according to claim 1 or 5, wherein the power supply unit (70) comprises a control module for controlling an amount and a supply period of time of the supplied electric current.

9. The binder according to claim 1, wherein the taper frame (32) further comprises an operation sensor (37) disposed between the taper frame (32) and the handle frame (10).

10. The binder according to claim 1, wherein the taper frame (32) further comprises an elastic member (38) disposed between the taper frame (32) and the handle frame (10).

11. The binder according to claim 1, wherein the head (50) comprises:
- a case having an upper case (51) and a lower case (52) and a pin (51-1) fit to the upper case (51) and the lower case (52);
- a hook lever (53) mounted inside the case, the hook lever (53) having an elongated hole (53-1) formed in one side to which the pin (51-1) is inserted, a hook (53-2) formed in a front end of the other side, an operation pin (53-3) and a fixing shaft (53-4) formed at the central portion thereof, and a tension spring (53-5) fit onto the operation pin and the fixing shaft;
- a cam plate (54) mounted inside the case and arranged below the hook lever (53), the cam plate having a cam hole (54-1) formed in one side thereof and a joining hole (54-2) formed in the other side to which the pin (51-1) is inserted;
- a first guide (55) mounted inside the case and arranged below the cam plate (54), the first guide (55) having a cam hole (55-1) formed at the central portion thereof, an elongated hole (55-2) formed at one side thereof to which the pin (51-1) is inserted, a retainer (55-3) to which a spring (55-5) is fit, and a recess (55-4);
- a second guide (56) mounted inside the case and arranged below the first guide (55), the second guide (56) having a cam hole (56-1) formed at the central portion thereof, an elongated hole (56-2) formed at one side thereof to which the pin (51-1) is inserted, a retainer (56-3) to which a spring (56-5) is fit, and a recess (56-4);
- a support (57) mounted inside a front end portion of the case;
- a rotational lever (58) mounted inside the case, the rotational lever (58) having a first rotational pin (58-1) formed at the bottom face of the central portion thereof and rotatably assembled to the case and a second rotational pin (58-2) rotating by operation of the first guide (55) and the second guide (56), the rotational lever (58) being rotated by the first and second rotational pins; and
- a push lever (59) movably fit and mounted from the front end portion of the case to an upper portion of the support.

12. The binder according to claim 11, wherein the cam hole (56-1) of the second guide (56),

is formed at the central portion of the second guide, and the operation pin (53-3) of the hook lever 53 is fit to the cam hole (56-1).

13. The binder according to claim 11, wherein the rotational lever (58) is rotatably operated by the rotational pin (58-2) which is inserted into the recesses (55-4)(56-4) respectively formed in the first guide (55) and the second guide (56).

14. The binder according to claim 11, wherein the push lever (59) has the retainer (59-1) formed at a rear end portion thereof and supported by the spring (59-2) fit thereto, so that the push lever (59) goes into and out of the front end portion of the case by operation of the rotational lever (58).

15. The binder according to claim 11, wherein operation pin (53-3) formed on the hook lever (53) is operably fit into the cam holes (54-1)(55-1)(56-1) respectively formed in the cam plate (54), the first guide (55), and the second guide (56).

* * * * *